(12) United States Patent
Zheng

(10) Patent No.: US 12,237,997 B2
(45) Date of Patent: Feb. 25, 2025

(54) COMPUTE-AWARE ROUTING METHOD AND APPARATUS

(71) Applicant: HUAWEI TECHNOLOGIES CO., LTD., Shenzhen (CN)

(72) Inventor: Ruobin Zheng, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 273 days.

(21) Appl. No.: 17/692,868

(22) Filed: Mar. 11, 2022

(65) Prior Publication Data

US 2022/0200898 A1 Jun. 23, 2022

Related U.S. Application Data

(63) Continuation of application No. PCT/CN2020/115154, filed on Sep. 14, 2020.

(30) Foreign Application Priority Data

Sep. 12, 2019 (CN) .......................... 201910866871.4

(51) Int. Cl.
*H04L 45/30* (2022.01)
*H04L 9/32* (2006.01)
*H04L 45/74* (2022.01)

(52) U.S. Cl.
CPC ............ *H04L 45/30* (2013.01); *H04L 9/3247* (2013.01); *H04L 45/74* (2013.01)

(58) Field of Classification Search
CPC ....... H04L 45/30; H04L 45/306; H04L 45/74; H04L 45/124; H04L 45/44; H04L 45/54; H04L 45/586; H04L 47/39; H04L 47/82; H04L 47/822; H04L 47/70; H04L 47/76; H04L 49/70; H04L 41/74; H04L 61/2571
See application file for complete search history.

(56) References Cited

U.S. PATENT DOCUMENTS 9,491,087 B1 * 11/2016 Zhang .................. H04L 45/745
11,070,469 B1 * 7/2021 Vairavakkalai ..... H04L 61/2571
(Continued)

FOREIGN PATENT DOCUMENTS

| CN | 103765832 A | 4/2014 |
|----|----|----|
| CN | 108009811 A | 5/2018 |

(Continued)

*Primary Examiner* — Mohamed A Kamara
(74) *Attorney, Agent, or Firm* — Rimon PC

(57) ABSTRACT

This disclosure provides for a compute-aware routing method and apparatus. The method include: a compute-aware router that receives compute-aware routing information of at least one computing container. The compute-aware routing information includes a computing code or a computing metric. The compute-aware router determines a routing information base (RIB) based on the compute-aware routing information. The RIB includes either a function identifier (FID) of a function that can be provided by the computing container or an Internet Protocol (IP) address prefix of the computing container in which the function is located and either the computing code or the computing metric. The function includes any one of a software-defined computing program, function program, service software, or microservice that is deployed in the computing container.

13 Claims, 22 Drawing Sheets

(56) References Cited

U.S. PATENT DOCUMENTS

| | | | | |
|---|---|---|---|---|
| 2010/0150155 | A1* | 6/2010 | Napierala | H04L 45/00 370/390 |
| 2011/0122889 | A1* | 5/2011 | Pacella | H04L 45/742 370/428 |
| 2021/0004245 | A1* | 1/2021 | Kamath | G06F 9/5077 |

FOREIGN PATENT DOCUMENTS

| | | |
|---|---|---|
| CN | 109462652 A | 3/2019 |
| CN | 110191116 A | 8/2019 |
| EP | 2860882 A1 | 4/2015 |
| EP | 2122942 B1 | 8/2017 |
| EP | 3243303 B1 | 8/2019 |
| WO | 2016096005 A1 | 6/2016 |

* cited by examiner

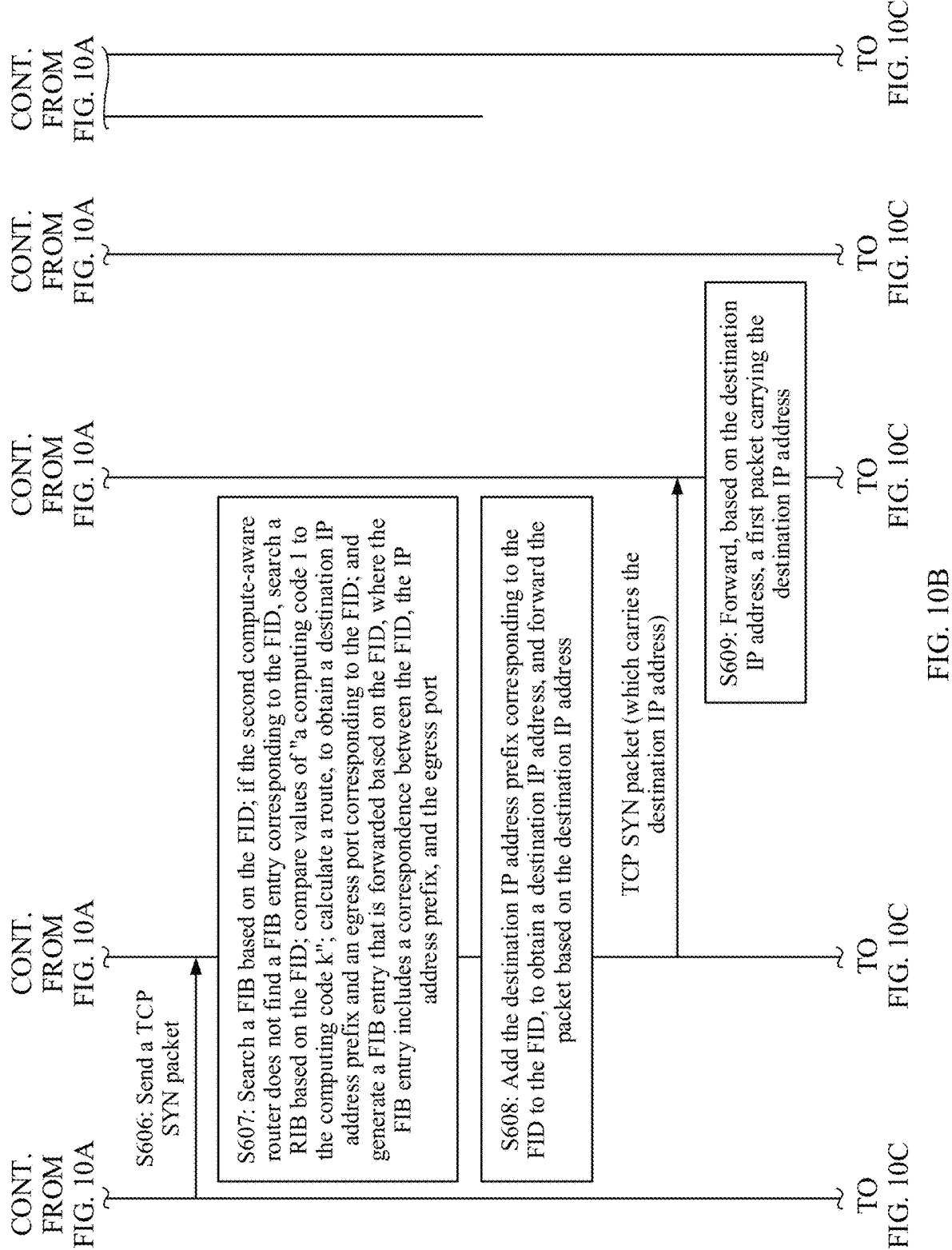

COMPUTE-AWARE ROUTING METHOD AND APPARATUS

CROSS-REFERENCE TO RELATED APPLICATIONS

This application is a continuation of International Application No. PCT/CN2020/115154, filed on Sep. 14, 2020, which claims priority to Chinese Patent Application No. 201910866871.4, filed on Sep. 12, 2019. The disclosures of the aforementioned applications are hereby incorporated by reference in their entireties.

TECHNICAL FIELD

This application generally relates to the field of communications technologies, and in particular, to a compute-aware routing method and apparatus.

BACKGROUND

Artificial intelligence technologies drive the transformation of a society from an information society into a smart society. A typical feature of a smart society is a deep integration between the physical world and the digital world. As time progresses, the digital world may interact with the real world by using sensors and actuators through technologies such as the Internet of things (IoT) and augmented reality (AR). Human-to-human interactions in conventional society is changing into interactions implemented through data and computing capabilities. A user and an application may no longer need to use the Internet to obtain information, but instead obtain computing resources and functions. One purpose of these approaches is to obtain computing results. Currently, traffic is still a metric of determining competitiveness within the Internet industry. A conventional manner of obtaining Internet traffic includes the utilization of a search engine, an aggregation website, a mobile distribution, a portal website, and the like. Based on the existing traffic obtaining manner, obtaining traffic is costly for Internet companies, and costs account for more than 30% of total costs of the Internet companies. How to obtain traffic with low costs and high efficiency has historically been a major problem for Internet companies. In smart societies, tens of thousands of Internet companies may obtain traffic simultaneously and require computing power (which is also referred to as a computing resource). A carrier may have a plurality of advantages of an edge equipment room and edge computing power after network cloudification when they also are an owner of computing power and are able to steer traffic.

How to dynamically and quickly match the foregoing supply and demand relationship to implement low-cost traffic sharing is an urgent problem that needs to be solved.

SUMMARY

This application provides a compute-aware routing method and apparatus, to implement low-cost traffic sharing.

According to a first aspect, an embodiment of this application provides a compute-aware routing method, including: a compute-aware router receives compute-aware routing information of at least one computing container, where the compute-aware routing information includes a computing code or a computing metric; the compute-aware router determines a routing information base (RIB) based on the compute-aware routing information, where the RIB includes either a function identifier (FID) of a function that can be provided by the computing container or an Internet Protocol (IP) address prefix of the computing container in which the function is located and either one of the computing code or the computing metric, and the function includes at least one of a software-defined computing program, function program, service software, or microservice that is deployed in the computing container; and the compute-aware router receives a packet, and forwards the packet based on a forwarding information base (FIB), where the FIB is determined based on the RIB, and the FIB includes the FID or the IP address prefix.

According to the compute-aware routing method provided in the first aspect, the compute-aware router receives the compute-aware routing information of the at least one computing container, where the compute-aware routing information includes the computing code or the computing metric. Then, the compute-aware router sends the compute-aware routing information to another compute-aware router in a network. Then, the compute-aware router determines the RIB based on the compute-aware routing information. Finally, after receiving the packet, the compute-aware router forwards the packet based on the FIB, and routes the packet to a corresponding computing container, where the FIB is determined based on the RIB. The compute-aware routing information represents a computing capability that can be provided by the computing container. Therefore, a packet related to a computing task can be routed to a corresponding computing container. This implements optimal consumer experience, optimal computing resource usage, and optimal network efficiency. A routing process is equivalent to computing power bidding in which a consumer of traffic bids for computing power, and an owner of traffic releases computing power. This dynamically and quickly matches a supply and demand relationship between a carrier and an Internet company; and implements low-cost traffic sharing.

In a possible design, the method further includes: the compute-aware router sends the compute-aware routing information to another compute-aware router in the network.

In a possible design, when the compute-aware router does not find, in the FIB, a FIB entry corresponding to the packet, the method further includes: the compute-aware router determines, based on the computing code or the computing metric in the RIB, the FIB entry corresponding to the packet.

In a possible design, the RIB includes the FID, the computing metric, the IP address prefix, and an egress port; the FID, the computing code, the IP address prefix, and an egress port; the FID, the computing metric, an IP address of the compute-aware router, and an egress port; the FID, the computing code, an IP address of the compute-aware router, and an egress port; the IP address prefix, the computing metric, and an egress port; the IP address prefix, the computing code, and an egress port; the FID, the computing metric, and an egress port; or the FID, the computing code, and an egress port; and the FIB includes the FID, the IP address prefix, and the egress port; the FID, the IP address of the compute-aware router, and the egress port; or the FID and the egress port.

In a possible design, when the packet carries the FID, that the compute-aware router forwards the packet based on the FIB includes: the compute-aware router searches the FIB for the IP address prefix and the egress port that correspond to the FID; and the compute-aware router adds the IP address prefix corresponding to the FID to the FID to obtain a destination IP address, and forwards the packet based on the destination IP address; or the compute-aware router searches the FIB for the IP address of the compute-aware router and the egress port that correspond to the FID; the compute-aware router adds tunnel encapsulation to the packet by using the IP address of the compute-aware router as a tunnel destination address, or adds segment routing (SR) encapsulation to the packet by using the IP address of the compute-aware router as a segment identifier of SR; and the compute-aware router forwards the packet to which the tunnel encapsulation or SR encapsulation is added; or the compute-aware router searches the FIB for the egress port corresponding to the FID or the IP address prefix; and the compute-aware router forwards the packet through the egress port.

In a possible design, if the packet carries the IP address, that the compute-aware router forwards the packet based on the FIB includes: the compute-aware router forwards the packet based on the IP address.

In a possible design, the computing code includes at least one of an evaluated computing delay value or a computing capacity level, a machine type or a weighted value $\alpha 2$ related to machine type, and a server load, and when the compute-aware routing information includes the computing code, the method further includes: the compute-aware router calculates the computing metric based on the computing code and the following formula:

$$\text{computing metric} = \frac{\alpha 2 \times \text{computing capacity level}}{1 - \beta 2 \times \text{server load}} +$$

$$\gamma 2 \times \text{evaluated computing delay value};$$

$$\text{computing metric} = \frac{\alpha 2 \times \text{computing capacity level}}{1 - \beta 2 \times \text{server load}};$$

or computing metric = $\gamma 2 \times$ evaluated computing delay value, where $\beta 2$ and $\gamma 2$ are weighted values.

In a possible design, the method further includes: when the compute-aware router receives a response packet, the compute-aware router determines the FIB entry as a valid FIB entry; or when the compute-aware router does not receive the response packet, the compute-aware router deletes the FIB entry.

According to the method provided in this implementation, session request and session response message packets are exchanged in a session establishment phase for a session-based service. When the response packet is not received, the session fails to be established. In this case, if the FIB entry determined when the session request message packet is received is not deleted, a useless entry remains, and unnecessary waste of storage space is caused.

According to a second aspect, an embodiment of this application provides a compute-aware routing method, including: a leaf router obtains a computing code of a computing container, where the leaf router is deployed in the computing container; the leaf router sends compute-aware routing information of the computing container to a compute-aware router connected to the leaf router, to enable the compute-aware router to send the compute-aware routing information to another compute-aware router in a network, where the compute-aware routing information includes the computing code or a computing metric; and the leaf router receives and forwards a packet.

According to the compute-aware routing method provided in the second aspect, the leaf router obtains the computing code of the computing container, and sends the compute-aware routing information including the computing code or the computing metric to the compute-aware router connected to the leaf router, to enable the compute-aware router to send the compute-aware routing information to another compute-aware router in the network. Finally, the leaf router receives and forwards the packet. In other words, the leaf router forwards the packet to the computing container. The compute-aware routing information represents a computing capability that can be provided by the computing container. Therefore, a packet related to a computing task can be routed to a corresponding computing container. This implements optimal consumer experience, optimal computing resource usage, and optimal network efficiency. A routing process is equivalent to computing power bidding in which a consumer of traffic bids for computing power, and an owner of traffic releases computing power. This dynamically and quickly matches a supply and demand relationship between a carrier and an Internet company, and implements low-cost traffic sharing.

In a possible design, that a leaf router obtains a computing code of a computing container includes: the leaf router obtains the computing code from the computing container and/or a measurement tool, where the computing code includes an evaluated computing delay value and/or a computing capacity level, a machine type or a weighted value $\alpha 2$ related to machine type, and a server load, and the evaluated computing delay value is measured by the measurement tool.

In a possible design, if the compute-aware routing information includes the computing metric, the method further includes: the leaf router calculates the computing metric based on the computing code and the following formula:

$$\text{computing metric} = \frac{\alpha 2 \times \text{computing capacity level}}{1 - \beta 2 \times \text{server load}} +$$

$$\gamma 2 \times \text{evaluated computing delay value};$$

$$\text{computing metric} = \frac{\alpha 2 \times \text{computing capacity level}}{1 - \beta 2 \times \text{server load}};$$

or computing metric = $\gamma 2 \times$ evaluated computing delay value, where $\beta 2$ and $\gamma 2$ are weighted values.

In a possible design, the method further includes: the leaf router calculates a computing token based on the computing code and the following formula:

$$\text{computing token} = \alpha 1 \times [\beta 1 - (\text{computing metric})],$$

where $\alpha 1$ and $\beta 1$ are computing power pricing coefficients.

In a possible design, the compute-aware routing information further includes: a function identifier (FID) of a function that can be provided by the computing container, and an Internet Protocol (IP) address prefix or an IP address of the computing container in which the function is located, where the function comprises a software-defined computing program, function program, service software, or microservice that is deployed in the computing container.

In a possible design, after the leaf router receives the packet, the method further includes: the leaf router triggers a contract platform to transfer the computing token to a consumer of computing power.

In a possible design, the method further includes: the leaf router receives a response packet sent by the computing container, where the response packet carries the IP address of the computing container; and the leaf router sends the response packet to a client by using the compute-aware router connected to the leaf router, where the response packet is used by the client to change the FID carried in the packet to the IP address of the computing container during subsequent communication.

According to a third aspect, an embodiment of this application provides a compute-aware routing apparatus, including: a receiving module, configured to receive compute-aware routing information of at least one computing container, where the compute-aware routing information includes a computing code or a computing metric; a determining module, configured to determine a routing information base (RIB) based on the compute-aware routing information, where the RIB includes either a function identifier (FID) of a function that can be provided by the computing container or an Internet Protocol (IP) address prefix of the computing container in which the function is located and either one of the computing code or the computing metric, and the function includes any one of a software-defined computing program, function program, service software, or microservice that is deployed in the computing container, where the receiving module is further configured to receive a packet; and a sending module, configured to forward the packet based on a forwarding information base (FIB), where the FIB is determined based on the RIB, and the FIB includes the FID or the IP address prefix.

In a possible design, the sending module is further configured to: send the compute-aware routing information to another compute-aware router in a network.

In a possible design, when the compute-aware router does not find, in the FIB, a FIB entry corresponding to the packet, the determining module is further configured to: determine, based on the computing code or the computing metric in the RIB, the FIB entry corresponding to the packet.

In a possible design, the RIB includes the FID, the computing metric, the IP address prefix, and an egress port; the FID, the computing code, the IP address prefix, and an egress port; the FID, the computing metric, an IP address of the compute-aware router, and an egress port; the FID, the computing code, an IP address of the compute-aware router, and an egress port; the IP address prefix, the computing metric, and an egress port; the IP address prefix, the computing code, and an egress port; the FID, the computing metric, and an egress port; or the FID, the computing code, and an egress port; and the FIB includes the FID, the IP address prefix, and the egress port; the FID, the IP address of the compute-aware router, and the egress port; or the FID and the egress port.

In a possible design, if the packet carries the FID, the sending module is configured to: search the FIB for the IP address prefix and the egress port that correspond to the FID; and add the IP address prefix corresponding to the FID to the FID, to obtain a destination IP address, and forward the packet based on the destination IP address; or search the FIB for the IP address of the compute-aware router and the egress port that correspond to the FID; add tunnel encapsulation to the packet by using the IP address of the compute-aware router as a tunnel destination address, or add segment routing (SR) encapsulation to the packet by using the IP address of the compute-aware router as a segment identifier of segment routing (SR); and forward the packet to which the tunnel encapsulation or SR encapsulation is added; or search the FIB for the egress port corresponding to the FID or the IP address prefix; and forward the packet through the egress port.

In a possible design, the computing code includes an evaluated computing delay value and/or a computing capacity level, a machine type or a weighted value α2 related to machine type, and a server load, and when the compute-aware routing information includes the computing code, the apparatus further includes: a computing module, configured to calculate the computing metric based on the computing code and the following formula:

$$\text{computing metric} = \frac{\alpha 2 \times \text{computing capacity level}}{1 - \beta 2 \times \text{server load}} +$$
$$\gamma 2 \times \text{evaluated computing delay value;}$$

$$\text{computing metric} = \frac{\alpha 2 \times \text{computing capacity level}}{1 - \beta 2 \times \text{server load}};$$

or computing metric = $\gamma 2 \times$ evaluated computing delay value, where

β2 and γ2 are weighted values.

In a possible design, the apparatus further includes: a processing module, configured to: if the receiving module receives a response packet, determine the FIB entry as a valid FIB entry; and if the receiving module does not receive the response packet, delete the FIB entry.

According to a fourth aspect, an embodiment of this application provides a compute-aware routing apparatus, including: an obtaining module, configured to obtain a computing code of a computing container, where a leaf router is deployed in the computing container; a sending module, configured to send compute-aware routing information of the computing container to a compute-aware router connected to the leaf router, to enable the compute-aware router to send the compute-aware routing information to another compute-aware router in a network, where the compute-aware routing information includes the computing code or a computing metric; and a receiving module, configured to receive a packet, where the sending module is further configured to forward the packet.

In a possible design, the obtaining module is configured to: obtain the computing code from the computing container and/or a measurement tool, where the computing code includes an evaluated computing delay value and/or a computing capacity level, a machine type or a weighted value α2 related to machine type, and a server load, and the evaluated computing delay value is measured by the measurement tool.

In a possible design, if the compute-aware routing information includes the computing metric, the apparatus further includes: a computing module, configured to calculate the computing metric based on the computing code and the following formula:

$$\text{computing metric} = \frac{\alpha 2 \times \text{computing capacity level}}{1 - \beta 2 \times \text{server load}} +$$
$$\gamma 2 \times \text{evaluated computing delay value;}$$

$$\text{computing metric} = \frac{\alpha 2 \times \text{computing capacity level}}{1 - \beta 2 \times \text{server load}};$$

or computing metric = $\gamma 2 \times$ evaluated computing delay value, where

β2 and γ2 are weighted values.

In a possible design, the computing module is further configured to: calculate a computing token based on the computing code and the following formula:

$$\text{computing token} = \alpha 1 \times [\beta 1 - (\text{computing metric})],$$

where

α1 and β1 are computing power pricing coefficients.

In a possible design, the compute-aware routing information further includes: a function identifier (FID) of a function that can be provided by the computing container, and an Internet Protocol (IP) address prefix or an IP address of the computing container in which the function is located, where the function comprises a software-defined computing program, function program, service software, or microservice that is deployed in the computing container.

According to a fifth aspect, an embodiment of this application provides an apparatus, including: a processor; and a memory, configured to store executable instructions of the processor, where the processor is configured to perform, by executing the executable instructions, the compute-aware routing method in any one of the first aspect and the possible designs of the first aspect or any one of the second aspect and the possible designs of the second aspect.

In a possible design, the foregoing apparatus may be a routing device or a chip.

According to a sixth aspect, this application provides a computer-readable storage medium, where the computer-readable storage medium stores instructions, and when the instructions are run on a computer, the computer is enabled to execute methods described in the foregoing aspects.

According to a seventh aspect, this application provides a computer program product including instructions. When the computer program product is run on a computer, the computer is enabled to perform methods described in the foregoing aspects.

BRIEF DESCRIPTION OF DRAWINGS

FIG. 10A, FIG. 10B, FIG. 10C, and FIG. 10D are a flowchart of an embodiment of a compute-aware routing method according to this application;

DESCRIPTION OF EMBODIMENTS

Figure 1:
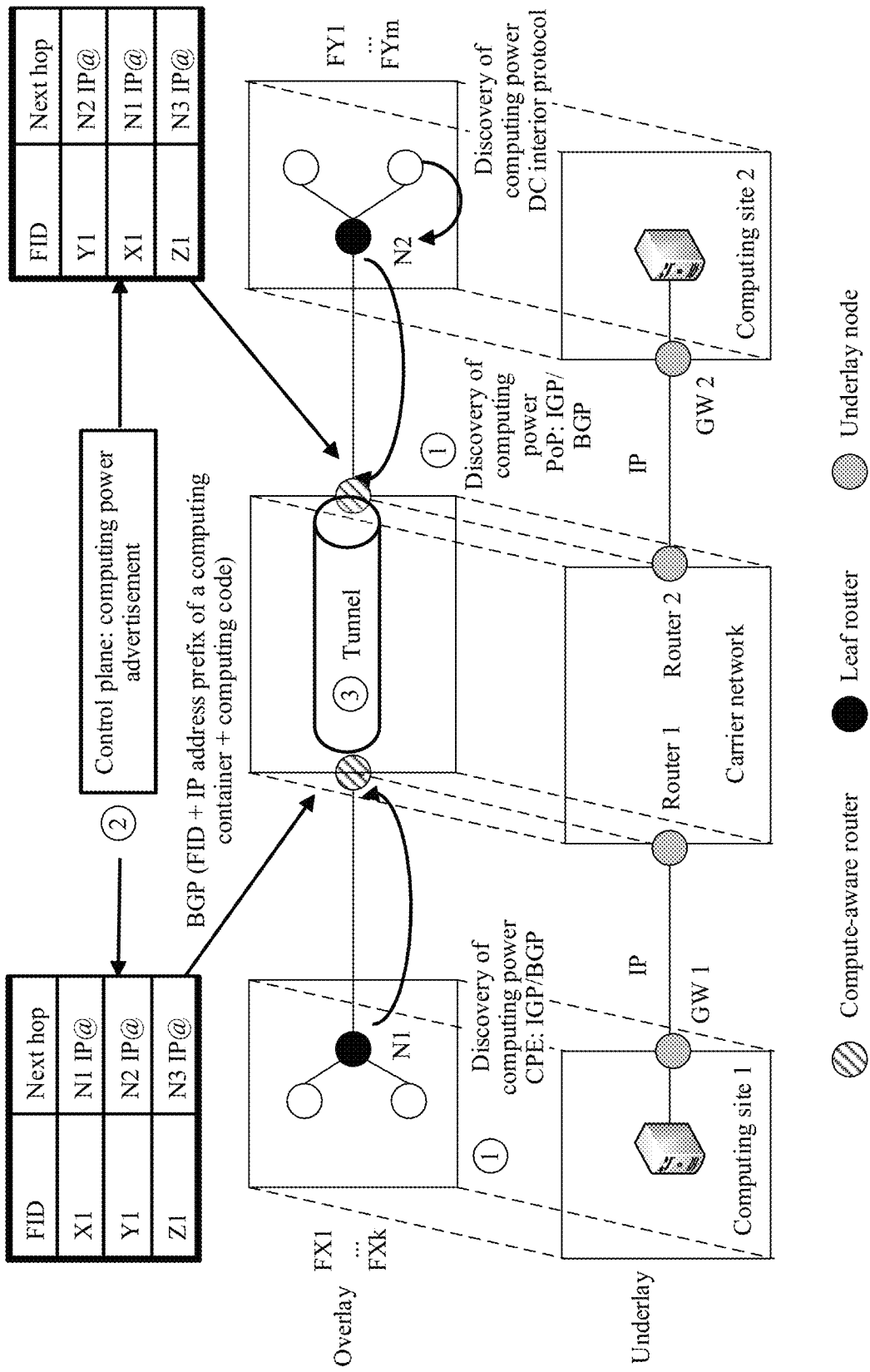
FIG. 1 is a schematic diagram of an architecture of a compute-aware network according to an embodiment of this application.

In embodiments of this application, words such as "example" or "for example" are used to indicate examples, instances, or description. Any embodiment or solution described as "example" or "for example" in the embodiments of this application is not to be construed as being more preferred or having more advantages than another embodiment or solution. Instead, usage of the words such as "example" or "for example" are intended to present a related concept in a specific manner.

In this application, "at least one" means one or more, and "a plurality of" means two or more. The term "and/or" describes an association relationship between associated objects and may indicate three relationships. For example, A and/or B may indicate the following cases: Only A exists, both A and B exist, and only B exists, where A and B may be singular or plural. The character "/" usually indicates an "or" relationship between the associated objects.

First, the following describes some terms in the embodiments of this application, to facilitate understanding of a person skilled in the art.

1. A function is a software-defined computing program, function program, service software, or microservice that is deployed in a computing site.

2. A computing container may be a computing site, a server, a virtual machine or a container, or a smaller unit that provides a computing resource. The computing site may be a customer-premises equipment (CPE) site on a consumer side, for example, a site in which a company network is located (the company network has a gateway (GW) device and a server, for example, both the gateway device and the server can be computing sites) or a site in which a home network is located.

3. A computing code is a technical abstraction of a computing capability that can be provided by a computing container, and is a computing metric value that is spread and propagated between routers. The computing code includes an evaluated computing delay value and/or a computing capacity level, a machine type or a weighted value α2 related to machine type, and a server load.

4. A computing token is a business abstraction of a computing capability that can be provided by a computing container, and is equivalent to the computing capability that can be provided by the computing container of a carrier. The computing token is transmitted in a compute-aware network in a technical form of a computing code.

Embodiments of this application are directed to implementing low-cost traffic sharing by dynamically and quickly matching a supply and demand relationship between a carrier and an Internet company. Embodiments of this application are further directed to adapting to a development of a smart society. This application further provides a compute-aware routing method and apparatus. For example, one apparatus is directed to a leaf router deployed in a computing container that sends compute-aware routing information of the computing container to a compute-aware router connected to the leaf router. The compute-aware router advertises the compute-aware routing information to another compute-aware router in a network, to enable another compute-aware router to obtain compute-aware routing information of all computing containers in the network. The compute-aware router determines a routing information base (RIB) based on the compute-aware routing information, and after receiving a packet, the compute-aware router routes, based on a forwarding information base (FIB) and a function identifier (FID) carried in the packet, where the packet is the computing container in which the FID is located. Therefore, a packet related to a computing task can be routed to a corresponding computing container. A routing process is equivalent to computing power bidding in which a consumer of traffic bids for computing power, and an owner of traffic releases computing power. This dynamically and quickly matches a supply and demand relationship between a carrier and an Internet company, and implements low-cost traffic sharing. For the carrier, advantages of an edge equipment room and network cloudification are released for monetizing, namely, "a network connection and digital assets (computation and storage) related to the network connection," to help the carrier transform to an information and communications technology (ICT) service. For the Internet company, the Internet company invokes light assets (e.g., ICT services) from the carrier based on a requirement, and obtains traffic from a compute-aware network. This saves the Internet company from investing into a plurality of heavy asset investments and the costs for obtaining traffic. This approach also helps the Internet company transform to an asset-light business model.

The following describes in detail an implementation process of the compute-aware routing method and apparatus according to this application with reference to the accompanying drawings.

The embodiments of this application may be applied to a compute-aware network. FIG. 1 is a schematic diagram of an architecture of a compute-aware network according to this application. As shown in FIG. 1, the architecture includes a computing container and a compute-aware network (which is usually a carrier network), and may be divided into two layers, namely, an underlay and an overlay. A leaf router (which may also be referred to as a leaf node) is an external extension of the compute-aware network for sensing external computing power. The leaf router is deployed in the computing container. FIG. 1 is described by using an example in which the computing container is a computing site.

The computing site may be a customer-premises equipment (CPE) site on a consumer side, for example, a site in which a company network is located or a site in which a home network is located. The home network may have devices such as a home gateway, a computer, and a mobile phone. The devices in the CPE site are underlay devices.

The computing site may alternatively be a site on a network side, for example, a site in which a router, a point-of-presence (POP), a central office (CO), or a base station is located. The site includes a network device or a gateway device and a server. The devices in the site are underlay devices. Sites on the network side are usually sites that are reconstructed into small data centers or have computing resources such as servers.

A software-defined computing program, function program, service software, or microservice may be deployed in the computing site and may usually be deployed above the underlay device. A function represents the deployed software-defined computing program, function program, service software, or microservice, namely, FX1 to FXk, or FY1 to FYm shown in FIG. 1. The leaf router is deployed in the computing site. The software or devices belong to the overlay, that is, they are superimposed on the underlay layer.

Computing sites are interconnected by using the compute-aware network. The compute-aware network includes a compute-aware router (which is also referred to as a compute-aware node), and may further include a common router (e.g., a conventional router). The compute-aware router is configured to support compute-aware routing, while the common router may not have a capability of supporting compute-aware routing. The common router may be an underlay device. Software and/or hardware with a compute-aware routing function belong to the overlay, namely, the compute-aware router depicted in FIG. 1. A node on which the software and/or hardware in which the compute-aware routing function is superimposed is a compute-aware node. A router on which the software or hardware with the compute-aware routing function is superimposed is a compute-aware router. The overlay and the underlay device may be integrated or may be standalone devices, for example, such as an overlay node/device. In the embodiments of this application, computing power is a computing resource.

Figure 2:
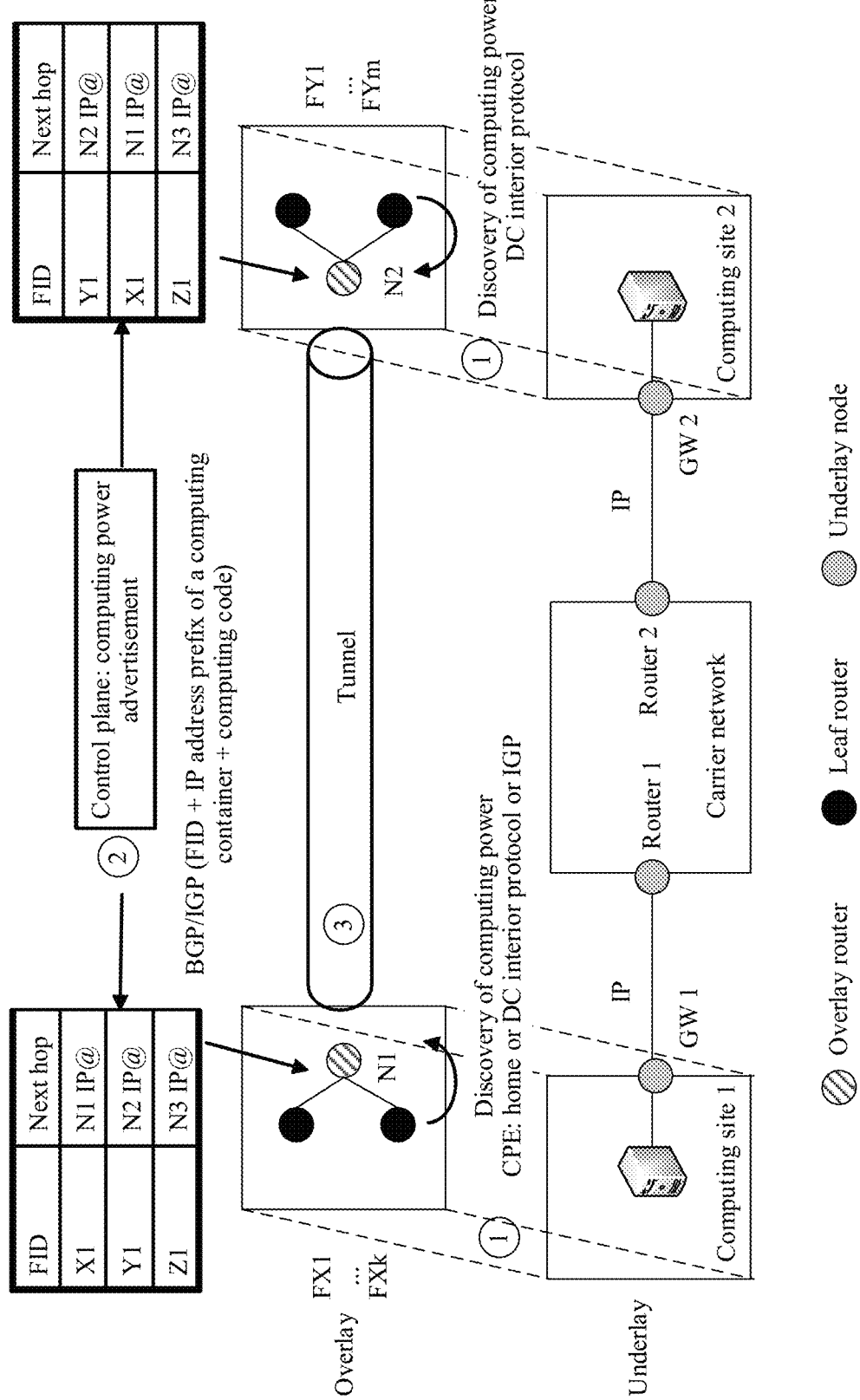
FIG. 2 is a schematic diagram of an architecture of another compute-aware network according to an embodiment of this application.

FIG. 2 is a schematic diagram of an architecture of another compute-aware network according to this application. FIG. 2 differs from FIG. 1 in that the compute-aware router shown in FIG. 2 is moved from an intermediate network to a computing site. Therefore, the compute-aware network is an overlay and includes a compute-aware router. The overlay and an underlay device in the computing site may be integrated or may be standalone devices, for example, such as an overlay compute-aware node/device.

Figure 3:
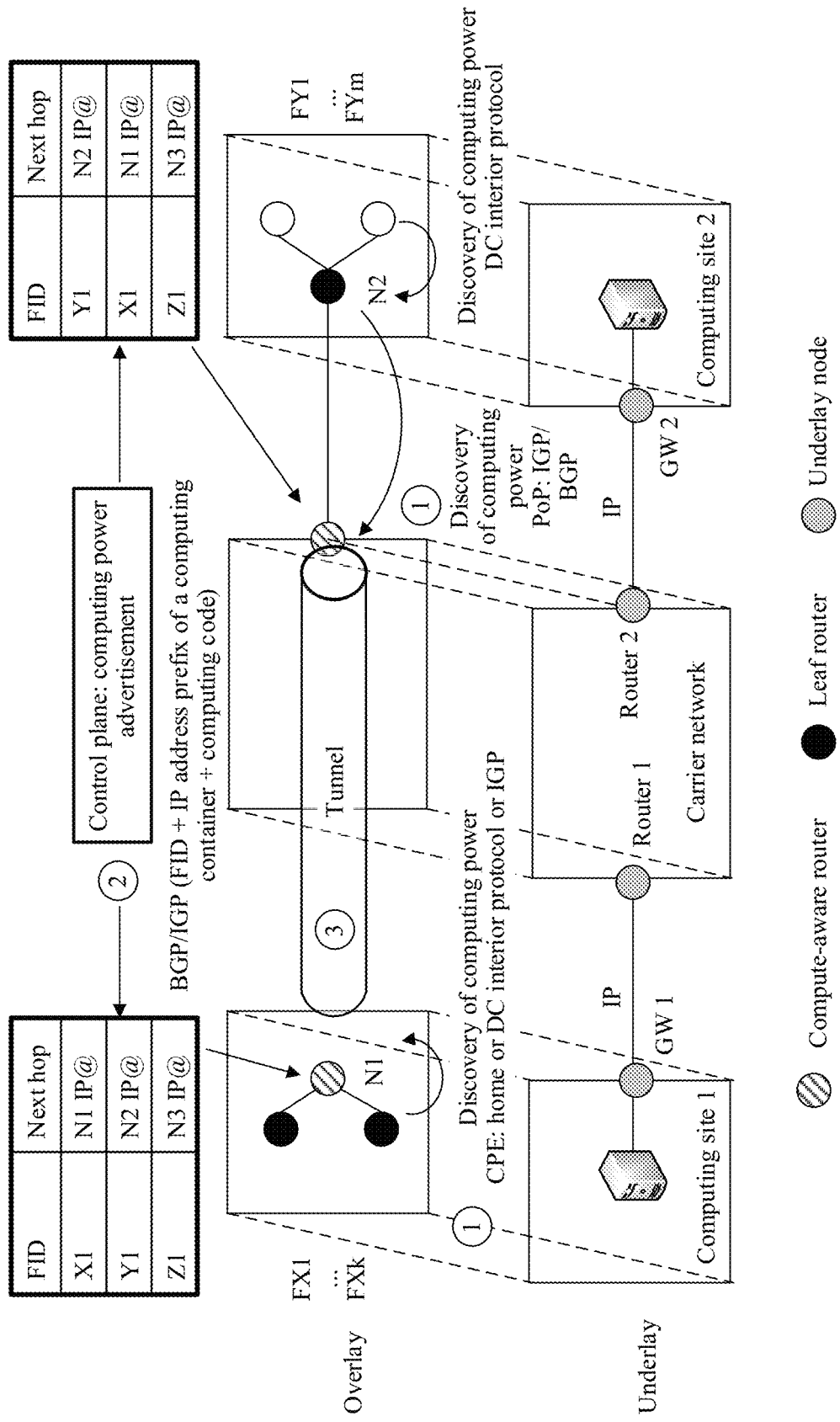
FIG. 3 is a schematic diagram of an architecture of still another compute-aware network according to an embodiment of this application.

FIG. 3 is a schematic diagram of an architecture of still another compute-aware network according to this application. As shown in FIG. 3, the architecture of the compute-aware network mixes/combines the architecture of FIG. 1 and the architecture of FIG. 2. A compute-aware router of FIG. 3 may be located in an intermediate network, or in a computing site.

In the embodiments of this application, the compute-aware network may implement three main functions:

(1) Automatic Discovery of a Function and/or Computing Power:

A leaf router advertises, to the compute-aware network, a computing resource of a site and/or a function that can be provided by the site and an IP address prefix/address of a computing container in which the function is located. In doing so, the compute-aware network can discover the function and/or computing power of the computing resource. The computing resource may be expressed in a form of a "computing code" in the embodiments. Compute-aware routing information may include the computing resource of the site, and/or the function that can be provided by the site, and the IP address prefix/address of the computing container in which the function is located. Advertisement may be implemented by using an extended direct connect (DC) interior protocol or an extended routing protocol (for example, an interior gateway protocol (IGP)/border gateway protocol (BGP)).

(2) Function and/or Computing Power Advertisement:

The compute-aware routing information is advertised between the compute-aware routers. The compute-aware routing information may further include an IP address prefix/address of the leaf router or an IP address prefix/address of a compute-aware router connected to the leaf router. Advertisement may be implemented between the compute-aware routers, so that compute-aware routers in the entire compute-aware network can find the function and/or computing power. Advertisement may also be implemented by using an extended DC interior protocol or an extended routing protocol (for example, an IGP/BGP).

(3) Function-Based Tunneling Technology:

Because underlay devices are reachable via IP addresses, that is, the underlay devices provide reachability for compute-aware routers, the compute-aware routers (e.g., nodes) may directly communicate with each other, to form a full mesh peer relationship in logic. The compute-aware routers may be logically interconnected by using a tunneling technology such as multiprotocol label switching (MPLS) or an IP, or being interconnected by using a segment routing (SR) technology.

Figure 4:
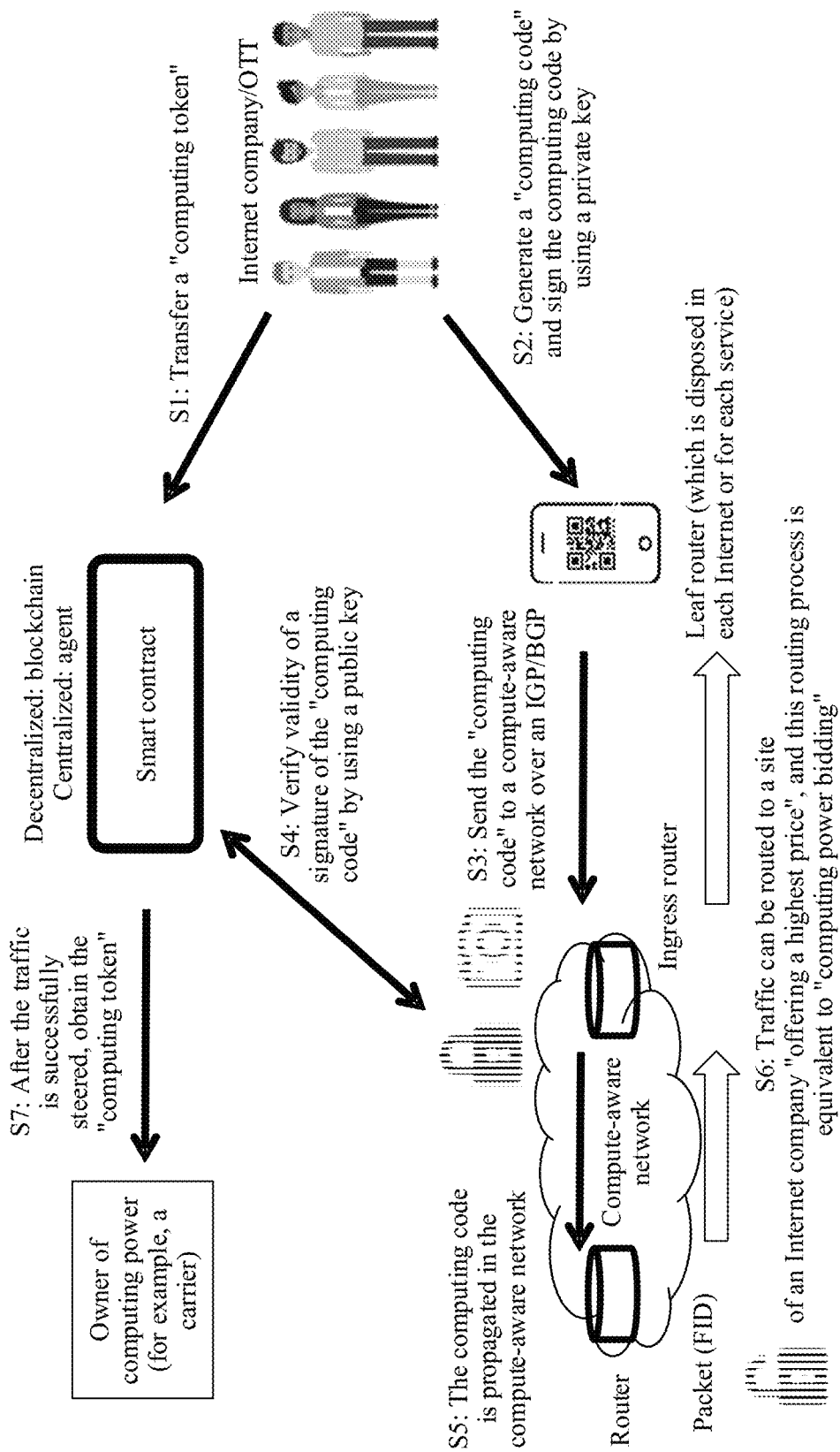
FIG. 4 is a schematic diagram of an application scenario of a compute-aware routing method and apparatus according to an embodiment of this application.

FIG. 4 is a schematic diagram of an application scenario of a compute-aware routing method and apparatus according to this application. As shown in FIG. 4, the method in these embodiments are described by using an example in which a computing container is a computing site, and includes the following procedures.

S1: An Internet company agrees with a carrier on a rent of computing power through a smart contract, and transfers, based on a computing capability that can be provided by a computing site of the carrier, an amount of "computing token(s)" equivalent to the computing capability to the to-be-rent smart contract.

S2: Convert the "computing token" (e.g., digital currency) into a "computing code", and sign the computing code by using a private key, where the computing code is similar to a two-dimensional code of a signature.

S3: A leaf router deployed in the computing site sends the "computing code" or a computing metric value derived from the "computing code" to a compute-aware network over a routing protocol (e.g., IGP/BGP), where the computing code or the computing metric derived from the computing code is first sent to an ingress router (which is a compute-aware router).

S4: The ingress router in the compute-aware network recognizes the "two-dimensional code" (namely; the computing code or the computing metric), verifies authenticity of the signature, and verifies validity of a signature of the computing code or a signature of the computing metric by using a public key. The ingress router may then inform the smart contract of the verification information to unlock a compute-aware routing "lock". After the compute-aware routing lock is unlocked, the computing code or the computing metric can be propagated in the compute-aware network.

S5: As a computing metric, the computing code or the computing metric is propagated in the compute-aware network through a router (which is a compute-aware router).

S6: The router selects, based on the "computing code" or the computing metric that represents the computing capability that can be provided by the computing site, an appropriate computing container by using an appropriate algorithm. The router may then obtain an optimal compute-aware route. Accordingly, traffic can then be routed to a site rented by an Internet company "offering a highest price" for computation. This routing process is equivalent to "computing power bidding".

S7: After the router successfully steers computing traffic, an owner of computing power (for example, the carrier) obtains the corresponding agreed "computing token" from the smart contract.

It should be noted that the "computing token" is equivalent to a computing capability that can be provided by the computing site of the carrier. In other words, the "computing token" is a business abstraction of a computing capability that can be provided by a computing site. The "computing code" is a technical abstraction of a computing capability that can be provided by a computing site. The "computing token" is transmitted in the compute-aware network in a technical form of the "computing code".

A leaf router/leaf node may be utilized in each Internet company or for each service, and is usually disposed in a data center or a computing container. The leaf router/leaf node may exist in a form of a hardware device or software, for example, such as a software-defined virtual router. The smart contract can be maintained on a platform. The platform may be a decentralized blockchain platform or a centralized agent platform, and may be used to implement payment or transfer of a computing token between a consumer of computing power (for example, an Internet company or a third party) and an owner of computing power (for example, a carrier or a company).

Network elements in this application may include a compute-aware router and a leaf router.

Figure 5:
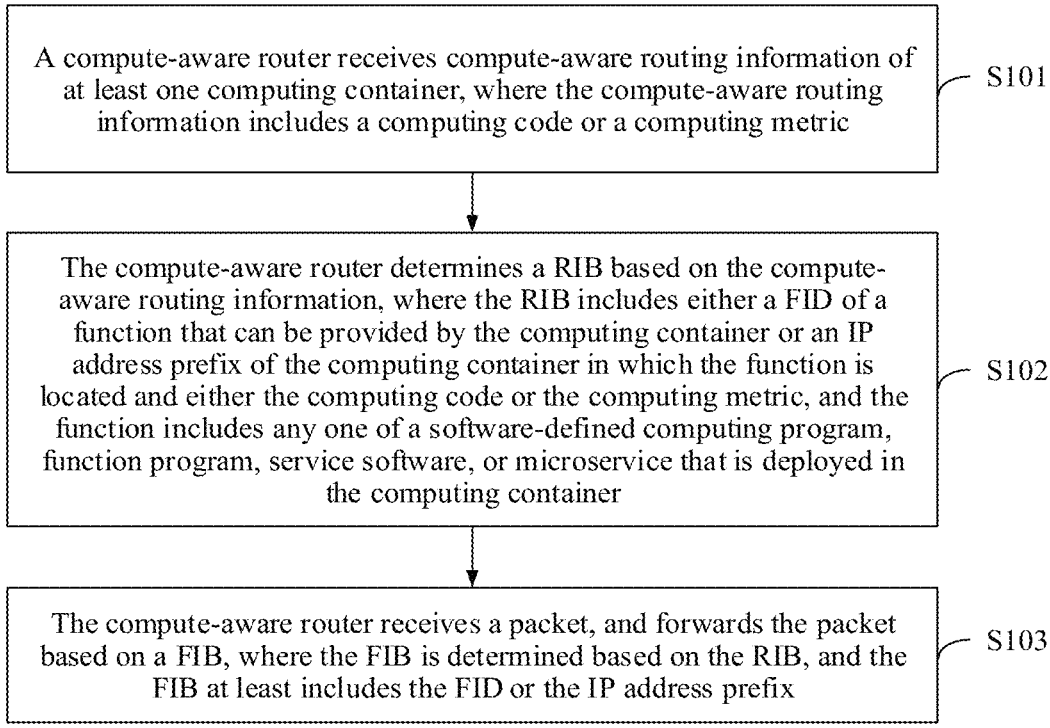
FIG. 5 is a flowchart of an embodiment of a compute-aware routing method according to this application.

FIG. 5 is a flowchart of an embodiment of a compute-aware routing method according to this application. These embodiments may be executed by a compute-aware router or a compute-aware node. As shown in FIG. 5, the method in these embodiments may include the following steps.

S101: A compute-aware router receives compute-aware routing information of at least one computing container, where the compute-aware routing information includes a computing code or a computing metric.

The compute-aware router receives the compute-aware routing information of the at least one computing container from at least one leaf router connected to the compute-aware router. The leaf router is deployed in the computing container, and at least one leaf router is deployed in one computing container.

Optionally, after S101, the method in these embodiments may further include:

S104: The compute-aware router sends the compute-aware routing information to another compute-aware router in a network.

The compute-aware routing information includes the computing code or the computing metric. If the computing code is a computing code signed by using a private key, before S104, the method may further include: After the compute-aware router verifies that a signature is valid, the compute-aware router unlocks a compute-aware routing lock, and triggers a computing power transaction, to obtain a validity period of the computing code. Namely, the compute-aware router obtains a valid time that the computing code can be used. For example, validity of the signature may be verified to a contract platform or a related department. When the validity period of the computing code expires, the compute-aware routing lock locks the computing code again. In other words, the corresponding computing code or the computing metric derived from the computing code may not be allowed to be propagated in the network.

The compute-aware router may send the compute-aware routing information to another compute-aware router in the network over an IGP/BGP.

S102: The compute-aware router determines a RIB based on the compute-aware routing information, where the RIB includes either a function identifier FID) of a function that can be provided by the computing container or an IP address prefix of the computing container in which the function is located and further includes either one of the computing code or the computing metric. The function includes any one of a software-defined computing program, function program, service software, or microservice that is deployed in the computing container. When the validity period of the computing code expires, a RIB entry corresponding to the computing code is deleted.

In other words, (1) the RIB includes the FID of the function that can be provided by the computing container and the computing code, (2) the RIB includes the FID of the function that can be provided by the computing container and the computing metric, (3) the RIB includes the IP address prefix of the computing container in which the function is located and the computing code, or (4) the RIB includes the IP address prefix of the computing container in which the function is located and the computing metric.

S103: The compute-aware router receives a packet, and forwards the packet based on an FIB, where the FIB is determined based on the RIB, and the FIB at least includes the FID or the IP address prefix.

In other words, the compute-aware routing information includes the computing code or the computing metric. The compute-aware router determines a RIB based on the compute-aware routing information may be based on: (1) The compute-aware router obtains a mapping relationship between the "computing code" (2) the computing metric and an egress port based on the "computing code" or the computing metric, (3) obtains a mapping relationship between the FID, the "computing code" or the computing metric, and an egress port based on the "computing code" or the computing metric, (4) obtains a mapping relationship between the IP address prefix, the "computing code" or the computing metric, and an egress port based on the "computing code" or the computing metric, or (5) the like.

Alternatively, a most appropriate computing container is selected by using an appropriate algorithm based on the computing metric that represents a computing capability that can be provided by a computing site. For example, after "computing codes" or computing metrics are compared, a minimum "computing code" or a computing container corresponding to the computing metric is selected, or a minimum "computing code" or a computing site corresponding to the computing metric is selected, to obtain a corresponding FIB entry.

Optionally, various configurations of what components the RIB includes are as follows: (1) the FID, the computing metric, the IP address prefix, and the egress port; (2) the FID, the computing code, the IP address prefix, and an egress port; (3) the FID, the computing metric, an IP address of the compute-aware router, and an egress port; (4) the FID, the computing code, an IP address of the compute-aware router, and an egress port; (5) the IP address prefix, the computing metric, and the egress port; (6) the IP address prefix, the computing code, and an egress port; (7) the FID, the computing metric, and the egress port; or (8) the FID, the computing code, and an egress port.

Correspondingly, the FIB may include (1) the FID, the IP address prefix, and the egress port, (2) the FID, the IP address of the compute-aware router, and the egress port, or (3) the FID and the egress port.

In a possible implementation, when the compute-aware router forwards the packet based on the FIB, and does not find, in the FIB, the FIB entry corresponding to the packet, the method in these embodiments may further include: the compute-aware router determines, based on the computing code or the computing metric in the RIB, the FIB entry corresponding to the packet. In other words, the compute-aware router may determine the FIB entry corresponding to the FID or the IP address prefix carried in the packet. For example, the compute-aware router selects, based on the "computing code" or the computing metric that represents the computing capability that can be provided by the computing site, a most appropriate computing container by using an appropriate algorithm. For example, after "computing codes" or computing metrics are compared, a minimum "computing code" or a computing container corresponding to the computing metric is selected, or a minimum "computing code" or a computing site corresponding to the computing metric is selected, to obtain the corresponding FIB entry.

In other words, the RIB at least includes either the FID of the function that can be provided by the computing container or the IP address prefix of the computing container in which the function is located and either one of the computing code or the computing metric. If the RIB includes the computing code, the compute-aware router compares values of all computing codes in the RIB. For example, if there are k computing codes, values of a computing code 1, a computing code 2, . . . , and a computing code k are compared, to calculate a route and obtain a destination IP address and/or the egress port, so as to obtain the FIB entry. The FIB entry includes the FID, the destination IP address, and the egress port. If the RIB includes the computing metric, the compute-aware router compares all computing metrics in the RIB. For example, if there are k computing metrics, a computing metric 1, a computing metric 2, . . . , and a computing metric k are compared, to calculate a route and obtain a destination IP address and/or the egress port, so as to obtain the FIB entry. The FIB entry includes the FID, the destination IP address, and the egress port.

In other words, if the packet carries the FID, three implementations of forwarding the packet based on the FIB are as follows:

Implementation 1: The compute-aware router searches the FIB for the IP address prefix and the egress port that correspond to the FID.

The compute-aware router adds the IP address prefix corresponding to the FID to the FID, to obtain a destination IP address, and forwards the packet based on the destination IP address.

Implementation 2: The compute-aware router searches the FIB for the IP address of the compute-aware router and the egress port that correspond to the FID.

The compute-aware router adds tunnel encapsulation to the packet by using the IP address of the compute-aware router as a tunnel destination address, or adds SR encapsulation to the packet by using the IP address of the compute-aware router as a segment identifier of segment routing (SR).

The compute-aware router forwards the packet to which the tunnel encapsulation or SR encapsulation is added.

Implementation 3: The compute-aware router searches the FIB for the egress port corresponding to the FID or the IP address prefix, and forwards the packet through the egress port.

If the packet carries the IP address, the forwarding the packet based on the routing information base FIB may be: The compute-aware router forwards the packet based on the IP address.

Optionally, the computing code includes an evaluated computing delay value and/or a computing capacity level, a machine type or a weighted value α2 related to machine type, and a server load. In other words, the computing code includes the evaluated computing delay value, or the computing code includes the computing capacity level, the machine type or the weighted value α2 related to the machine type, and the server load, or the computing code includes the evaluated computing delay value, the computing capacity level, the machine type or the weighted value α2 related to the machine type, and the server load. When the compute-aware routing information includes the computing code, the method in these embodiments may further include: the compute-aware router calculates the computing metric based on the computing code and the following formula:

$$\text{computing metric} = \frac{\alpha 2 \times \text{computing capacity level}}{1 - \beta 2 \times \text{server load}} +$$
$$\gamma 2 \times \text{evaluated computing delay value;}$$
$$\text{computing metric} = \frac{\alpha 2 \times \text{computing capacity level}}{1 - \beta 2 \times \text{server load}};$$
$$\text{or computing metric} = \gamma 2 \times \text{evaluated computing delay value,}$$

where
β2 and γ2 are weighted values. α2, β2, and γ2 may be obtained according to a contract between the consumer of computing power and the owner of computing power or a service level agreement (SLA).

If the compute-aware routing information includes the computing metric, the computing metric is obtained by the leaf router through calculation by using the foregoing calculation formula.

A smaller computing metric value indicates a stronger computing capability of the computing container, better quality of a computing service, and more computing tokens that need to be paid. The foregoing algorithm is merely an embodiment, and another algorithm may alternatively be used to obtain the computing metric.

Further, the method in these embodiments may further include: if the compute-aware router receives a response packet, the compute-aware router determines the determined FIB entry as a valid FIB entry; or if the compute-aware router does not receive the response packet, the compute-aware router deletes the determined FIB entry. Benefits of this method include, but are not limited to, session request and session response message packets are exchanged in a session establishment phase for a session-based service. When the response packet is not received, the session fails to be established. In this case, if the FIB entry determined when the session request message packet is received is not deleted, a useless entry remains, and unnecessary waste of storage space is caused.

In S103, after receiving the packet, the compute-aware router forwards the packet based on the FIB, and routes the packet to a corresponding computing container.

According to the compute-aware routing method provided in these embodiments, the compute-aware router receives the compute-aware routing information of the at least one computing container, where the compute-aware routing information includes the computing code or the computing metric. Then, the compute-aware router sends the compute-aware routing information to another compute-aware router in the network. Then, the compute-aware router determines the RIB based on the compute-aware routing information. Finally, after receiving the packet, the compute-aware router forwards the packet based on the FIB, and routes the packet to the corresponding computing container, where the FIB is determined based on the RIB. The compute-aware routing information represents the computing capability that can be provided by the computing container. Therefore, a packet related to a computing task can be routed to a corresponding computing container. This implements optimal consumer experience, optimal computing resource usage, and optimal network efficiency. A routing process is equivalent to computing power bidding in which a consumer of traffic bids for computing power, and an owner of traffic releases computing power. This dynamically and quickly matches a supply and demand relationship between a carrier and an Internet company; and implements low-cost traffic sharing.

Figure 6:
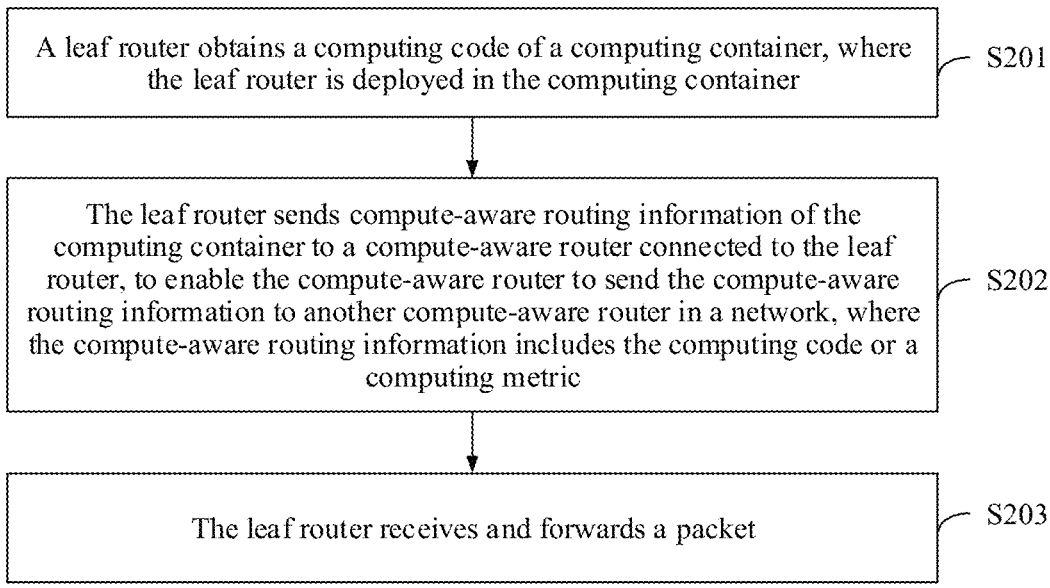
FIG. 6 is a flowchart of an embodiment of a compute-aware routing method according to this application.

FIG. 6 is a flowchart of an embodiment of a compute-aware routing method according to this application. These embodiments may be executed by a leaf router or a leaf node. As shown in FIG. 6, the method in these embodiments may include the following steps.

S201: A leaf router obtains a computing code of a computing container, where the leaf router is deployed in the computing container.

In a possible implementation, that a leaf router obtains a computing code of a computing container may be: the leaf router obtains the computing code from the computing container and/or a measurement tool, where the computing code includes an evaluated computing delay value and/or a computing capacity level, a machine type or a weighted value α2 related to machine type, and a server load, the evaluated computing delay value is measured by the measurement tool, and the measurement tool is IT software such as Openstack, K8S/Kubernetes, or an operation system.

For example, the computing capacity level corresponding to one server is 255, a computing capacity level corresponding to two servers is 127, a computing capacity level corresponding to 3 to 10 servers is 63, a computing capacity level corresponding to 10 to 1000 servers is 15, a computing capacity level corresponding to 1000 to 10000 servers is 7, and a computing capacity level corresponding to over 10000 servers is 3.

S202: The leaf router sends compute-aware routing information of the computing container to a compute-aware router connected to the leaf router, to enable the compute-aware router to send the compute-aware routing information to another compute-aware router in a network, where the compute-aware routing information includes the computing code or a computing metric.

Optionally, the compute-aware routing information may further include: an FID of a function that can be provided by the computing container, and an IP address prefix or an IP address of the computing container in which the function is located, where the function includes a software-defined computing program, function program, service software, or microservice that is deployed in the computing container.

Optionally, the compute-aware routing information may include, for example, a route target (RT)=6, a route distinguisher (RD)=advertisement of function-based routing, a function length (1 octet), the FID, a length of the IP address prefix (1 octet), the IP address prefix (4 or 16 octets) (the function and the IP address prefix (IPv4 or IPv6) of the computing container in which the function is located), and the computing code (8 octets).

In a possible implementation, if the compute-aware routing information includes the computing metric, the method in these embodiments may further include: the leaf router calculates the computing metric based on the computing code and the following formula:

$$\text{computing metric} = \frac{\alpha 2 \times \text{computing capacity level}}{1 - \beta 2 \times \text{server load}} +$$
$$\gamma 2 \times \text{evaluated computing delay value};$$
$$\text{computing metric} = \frac{\alpha 2 \times \text{computing capacity level}}{1 - \beta 2 \times \text{server load}};$$
$$\text{or computing metric} = \gamma 2 \times \text{evaluated computing delay value},$$

where $\beta 2$ and $\gamma 2$ are weighted values. $\alpha 2$, $\beta 2$, and $\gamma 2$ may be obtained according to a contract between the consumer of computing power and the owner of computing power or a SLA.

Further, the method may further include: the leaf router calculates a computing token based on the computing code and the following formula:

$$\text{computing token} = \alpha 1 \times [\beta 1 - (\text{computing metric})],$$

where $\alpha 1$ and $\beta 1$ are computing power pricing coefficients, and may be determined by an owner of computing power (for example, a carrier), or may be jointly determined by an owner of computing power and a consumer of computing power, or may be determined by a platform on which the contract is located.

S203: The leaf router receives and forwards a packet.

Further, after the leaf router receives the packet, the method in these embodiments may further include: The leaf router triggers a contract platform to transfer the computing token to the consumer of computing power.

Optionally, the method in these embodiments may further include: the leaf router receives a response packet sent by the computing container, where the response packet carries the IP address of the computing container.

The leaf router sends the response packet to a client by using the compute-aware router connected to the leaf router, where the response packet is used by the client to change the FID carried in the packet to the IP address of the computing container during subsequent communication, to resolve a problem of flow affinity.

According to the compute-aware routing method provided in these embodiments, the leaf router obtains the computing code of the computing container, and sends the compute-aware routing information including the computing code or the computing metric to the compute-aware router connected to the leaf router, to enable the compute-aware router to send the compute-aware routing information to another compute-aware router in the network. Finally, the leaf router receives and forwards the packet. In other words, the leaf router forwards the packet to the computing container. The compute-aware routing information represents a computing capability that can be provided by the computing container. Therefore, a packet related to a computing task can be routed to a corresponding computing container. This implements optimal consumer experience, optimal computing resource usage, and optimal network efficiency. A routing process is equivalent to computing power bidding in which a consumer of traffic bids for computing power, and an owner of traffic releases computing power. This dynamically and quickly matches a supply and demand relationship between a carrier and an Internet company, and implements low-cost traffic sharing.

The following describes technical solutions shown in FIG. 5 and FIG. 6 by using four specific embodiments as examples.

Figure 7A:
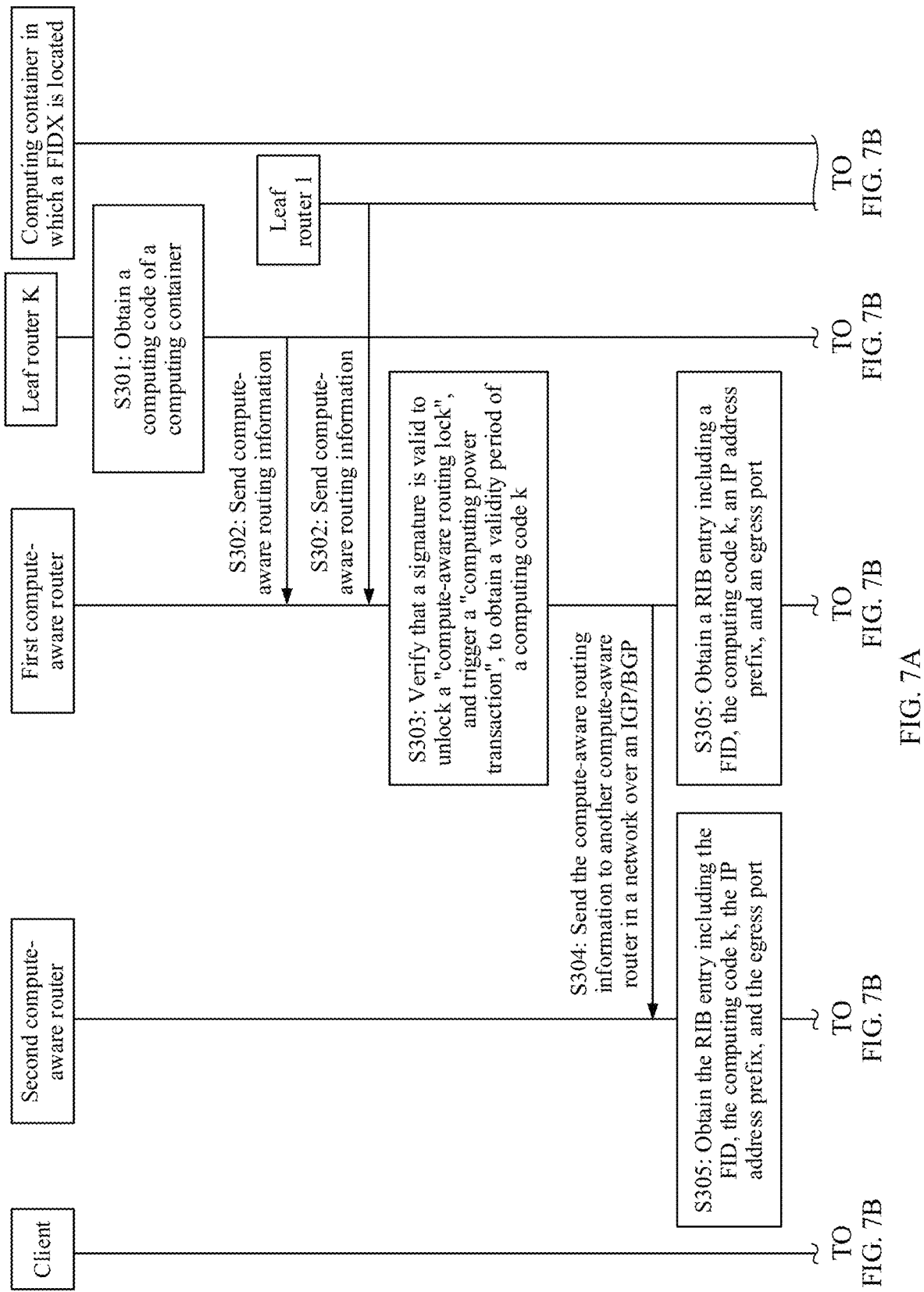
FIG. 7A, FIG. 7B, and FIG. 7C are a flowchart of an embodiment of a compute-aware routing method according to this application.
Figure 7B:
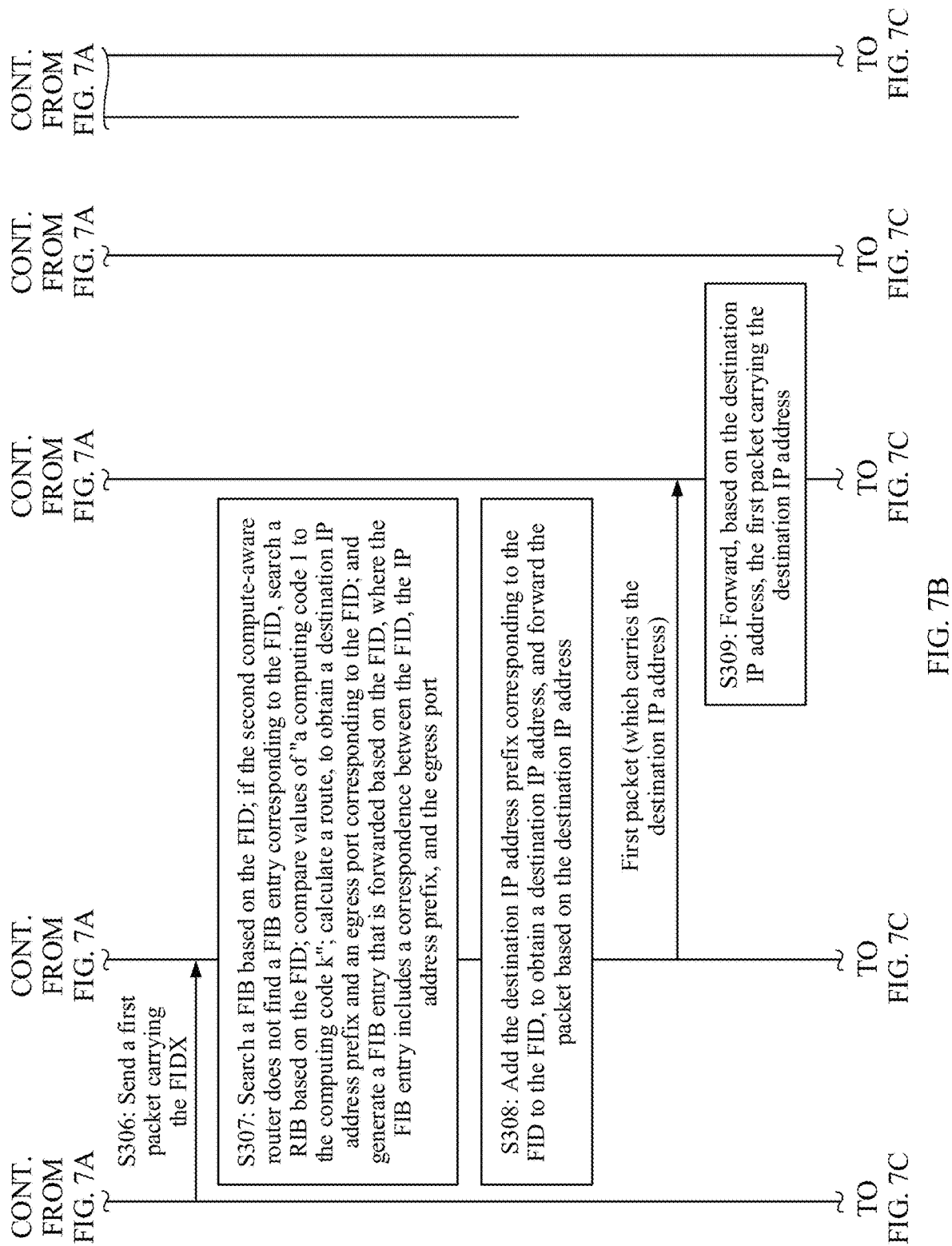
Figure 7C:
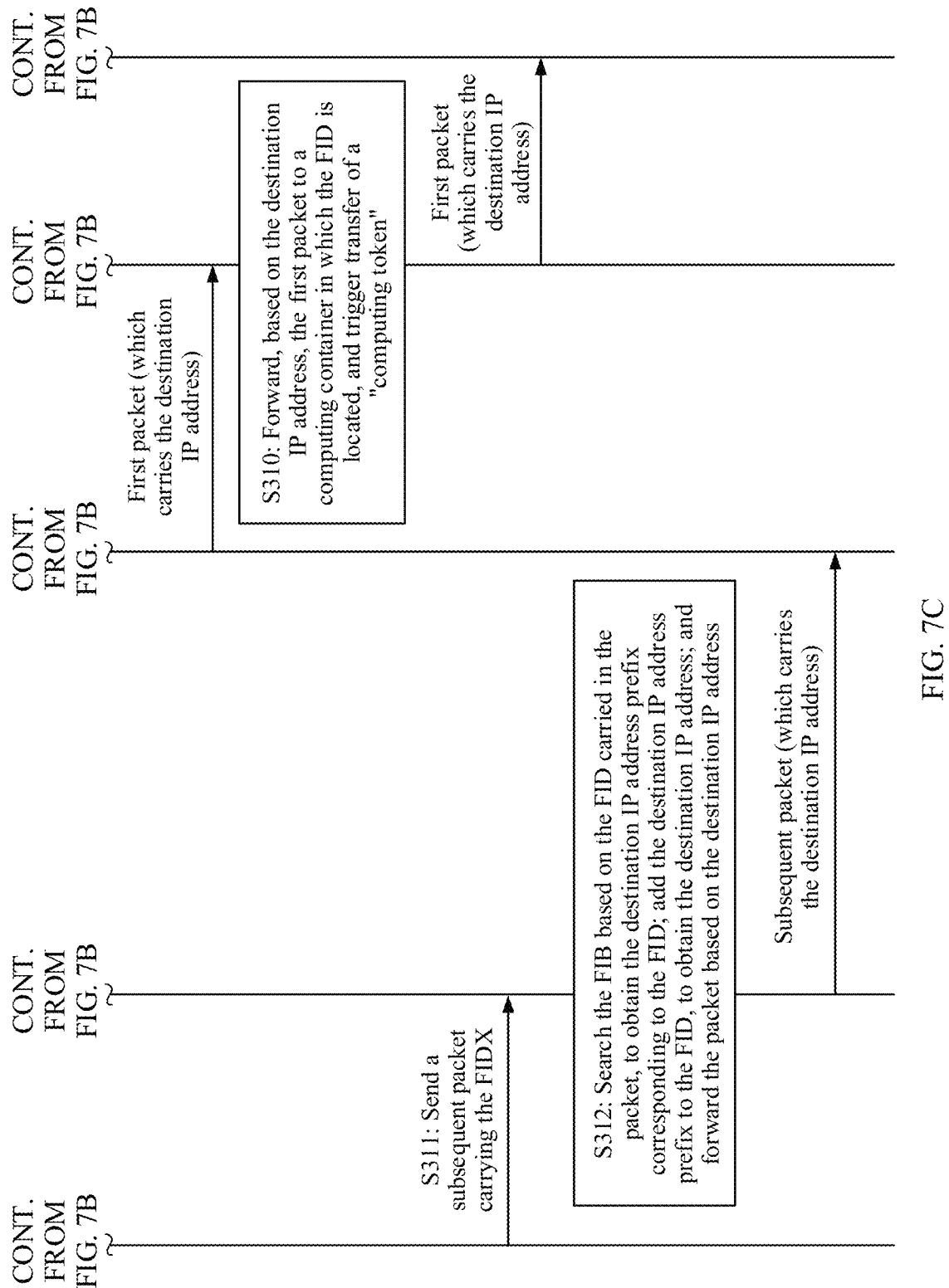

FIG. 7A, FIG. 7B, and FIG. 7C depict a flowchart of an embodiment of a compute-aware routing method according to this application. As shown in FIGS. 7A, 7B and 7C, the method in these embodiments may include the following steps:

S301: A leaf router obtains a computing code of a computing container, where the leaf router is deployed in the computing container.

In other words, for example, there are k leaf routers, a leaf router 1 obtains, from the computing container and/or an IT measurement tool, a computing code 1 signed by using a private key, a leaf router 2 obtains, from the computing container and/or the IT measurement tool, a computing code 2 signed by using the private key, . . . , and a leaf router K obtains, from the computing container and/or the IT measurement tool, a computing code k signed by using the private key.

In other words, the leaf router obtains a computing capacity level, a machine type or a weighted value $\alpha 2$ related to machine type, and a server load, and obtains an evaluated computing delay value from the IT measurement tool. The IT measurement tool measures the evaluated computing delay value. The IT measurement tool may be an IT software such as Openstack, K8S/Kubernetes, or an operation system, and the computing code includes the evaluated computing delay value and/or the computing capacity level, the machine type or the weighted value $\alpha 2$ related to the machine type, and the server load.

The leaf router calculates the computing metric based on the computing code and the following formula:

$$\text{computing metric} = \frac{\alpha 2 \times \text{computing capacity level}}{1 - \beta 2 \times \text{server load}} +$$
$$\gamma 2 \times \text{evaluated computing delay value};$$
$$\text{computing metric} = \frac{\alpha 2 \times \text{computing capacity level}}{1 - \beta 2 \times \text{server load}};$$
$$\text{or computing metric} = \gamma 2 \times \text{evaluated computing delay value},$$

where $\beta 2$ and $\gamma 2$ are weighted values. $\alpha 2$, $\beta 2$, and $\gamma 2$ may be obtained according to a contract between a consumer of computing power and an owner of computing power/ SLA.

The leaf router calculates a computing token based on the computing code and the following formula:

$$\text{computing token} = \alpha 1 \times [\beta 1 - (\text{computing metric})],$$

where

α1 and β1 are computing power pricing coefficients, and may be determined by the owner of computing power (for example, a carrier), or may be jointly determined by the owner of computing power and the consumer of computing power, or may be determined by a platform on which the contract is located.

S302: The leaf router 1 and the leaf router K send, over an IGP/BGP, compute-aware routing information to a first compute-aware router connected to the leaf router K.

The compute-aware routing information includes an FID, an IP address prefix of the computing container in which the leaf router is located, and the computing code k. If in S301, the leaf router calculates the computing metric based on the computing code, the compute-aware routing information includes the FID, the IP address prefix of the computing container in which the leaf router is located, and the computing metric k. If the compute-aware routing information does not include the computing metric, the compute-aware router that receives the compute-aware routing information calculates the computing metric based on the computing code.

S303: The first compute-aware router verifies that a signature is valid to a contract platform or a related department to unlock a "compute-aware routing lock", and triggers a "computing power transaction," to obtain a validity period of the computing code k.

The validity period of the computing code k is a valid time in which the computing code k can be used.

S304: The first compute-aware router sends the compute-aware routing information to another compute-aware router in a network over the IGP/BGP.

In other words, all compute-aware routers in the network obtain each computing code k, an IP address prefix and an FID that correspond to the computing code k, and the validity period of the computing code k. A RIB is generated based on the foregoing information. The RIB includes a correspondence between the computing code k, the IP address prefix, the FID, and an egress port.

S305: The first compute-aware router obtains a RIB entry including the FID, the computing code k, the IP address prefix, and the egress port.

A second compute-aware router obtains the RIB entry including the FID, the computing code k, the IP address prefix, and the egress port.

S306: A client sends a first packet carrying the FID.

For example, the first packet carries an FIDX.

S307: The second compute-aware router that receives the first packet searches an FIB based on the FID. If the second compute-aware router does not find an FIB entry corresponding to the FID, the second compute-aware router searches the RIB based on the FID. The second compute-aware router may then compare values of "the computing code 1 to the computing code k"; calculates a route, to obtain a destination IP address prefix and an egress port that correspond to the FID. The second compute-aware router may then generate an FIB entry that is forwarded based on the FID, where the FIB entry includes a correspondence between the FID, the IP address prefix, and the egress port.

S308: The second compute-aware router adds the destination IP address prefix corresponding to the FID to the FID, to obtain a destination IP address, and forwards the first packet to the first compute-aware router based on the destination IP address, where the forwarded first packet carries the destination IP address.

The destination IP address is an IP address of a computing container in which the FID is located.

S309: The first compute-aware router forwards, based on the destination IP address, the first packet carrying the destination IP address to the leaf router K.

The leaf router K herein is a leaf router connected to the first compute-aware router.

S310: The leaf router K forwards, based on the destination IP address, the first packet to the computing container in which the FID is located, and triggers transfer of the "computing token".

S311: The client sends a subsequent packet carrying the FIDX to the second compute-aware router.

S312: The second compute-aware router searches the FIB based on the FID carried in the packet, to obtain the destination IP address prefix corresponding to the FID. The second compute-aware router adds the destination IP address prefix to the FID, to obtain the destination IP address. The second compute-aware router may then forward the packet to the first compute-aware router based on the destination IP address where the forwarded first packet carries the destination IP address.

S313: The first compute-aware router forwards, based on the destination IP address, the packet carrying the destination IP address to the leaf router.

S314: The leaf router forwards, based on the destination IP address, the packet to the computing container in which the FID is located.

A condition for triggering transfer of the computing token or the computing power transaction may be that, for example, the computing code is successfully injected into a compute-aware network, a compute-aware network generates the RIB/FIB, or a compute-aware network successfully routes the packet to the leaf router or a computing station to which an Internet company/third party belongs. The packet carries the FID. The FID is not an IP address and may need to be carried in a specific domain, for example, in a destination address domain of an IP packet. An ingress node of the compute-aware network (for example, an ingress compute-aware router or the second compute-aware router in FIG. 7A, FIG. 7B, and FIG. 7C) may need to select a route based on a computing metric, and perform forwarding based on an FID. Other routers can perform forwarding based on a conventional IP. Therefore, an investment of an existing IP router can be protected.

Figure 8A:
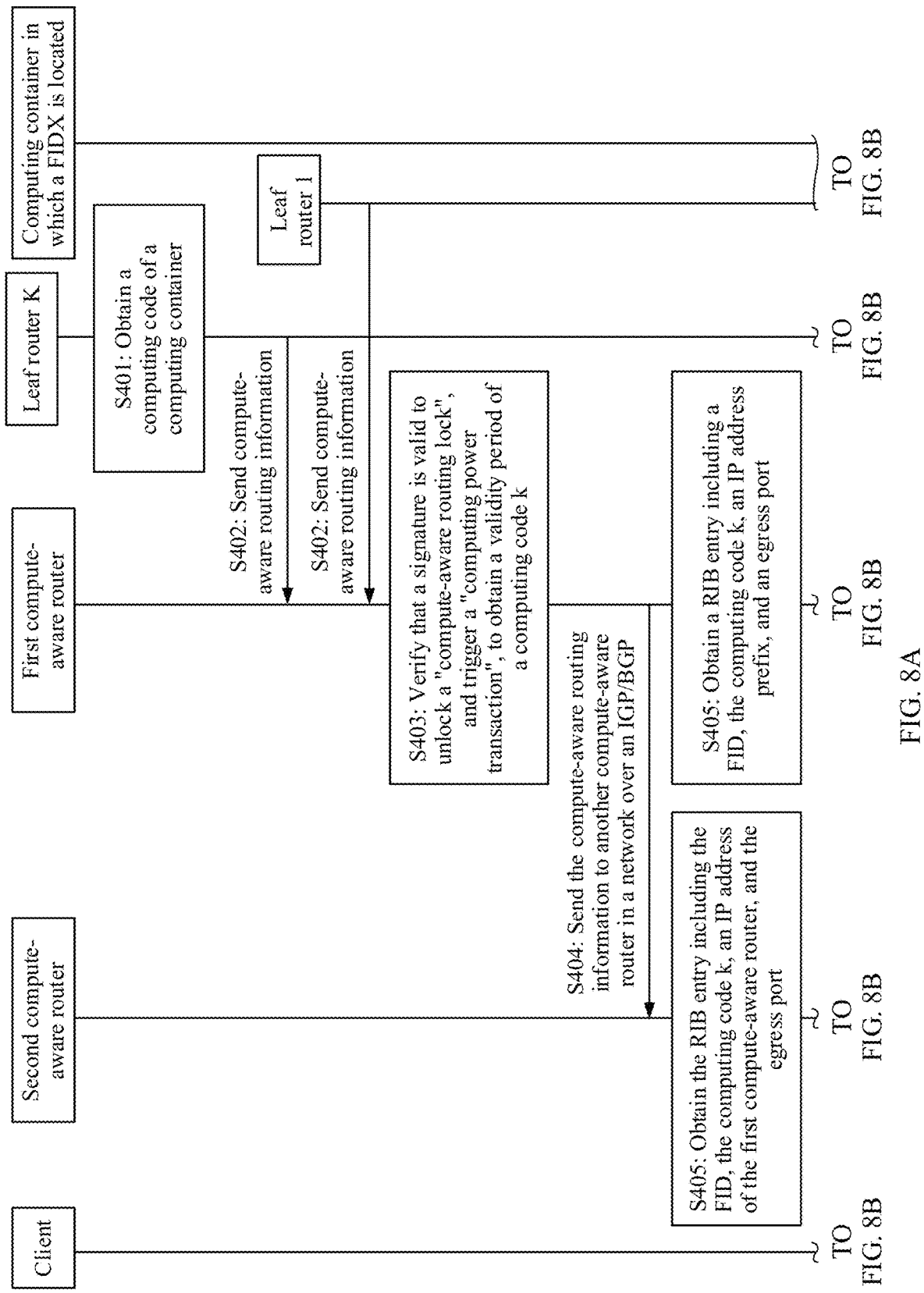
FIG. 8A, FIG. 8B, and FIG. 8C are a flowchart of an embodiment of a compute-aware routing method according to this application.
Figure 8B:
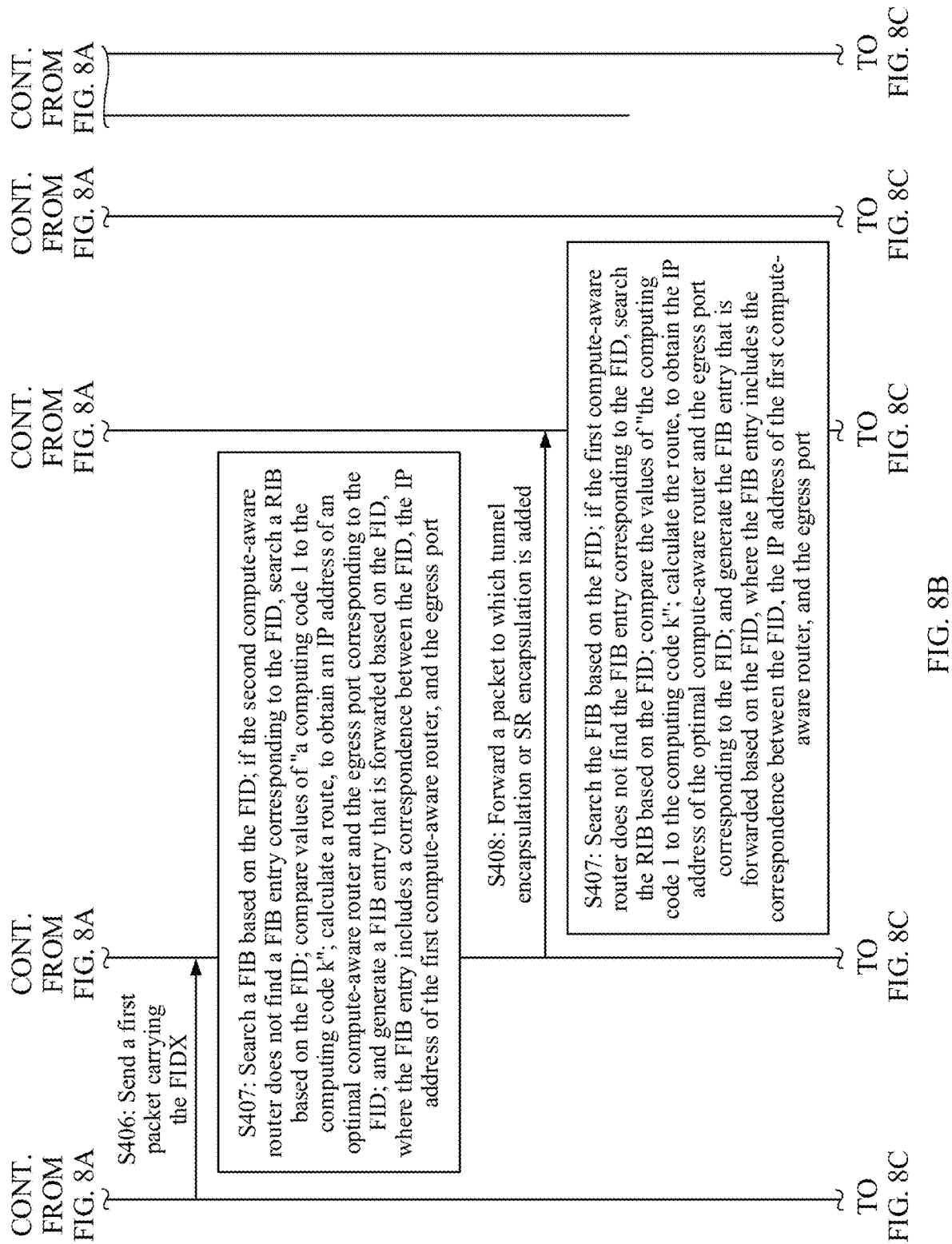
Figure 8C:
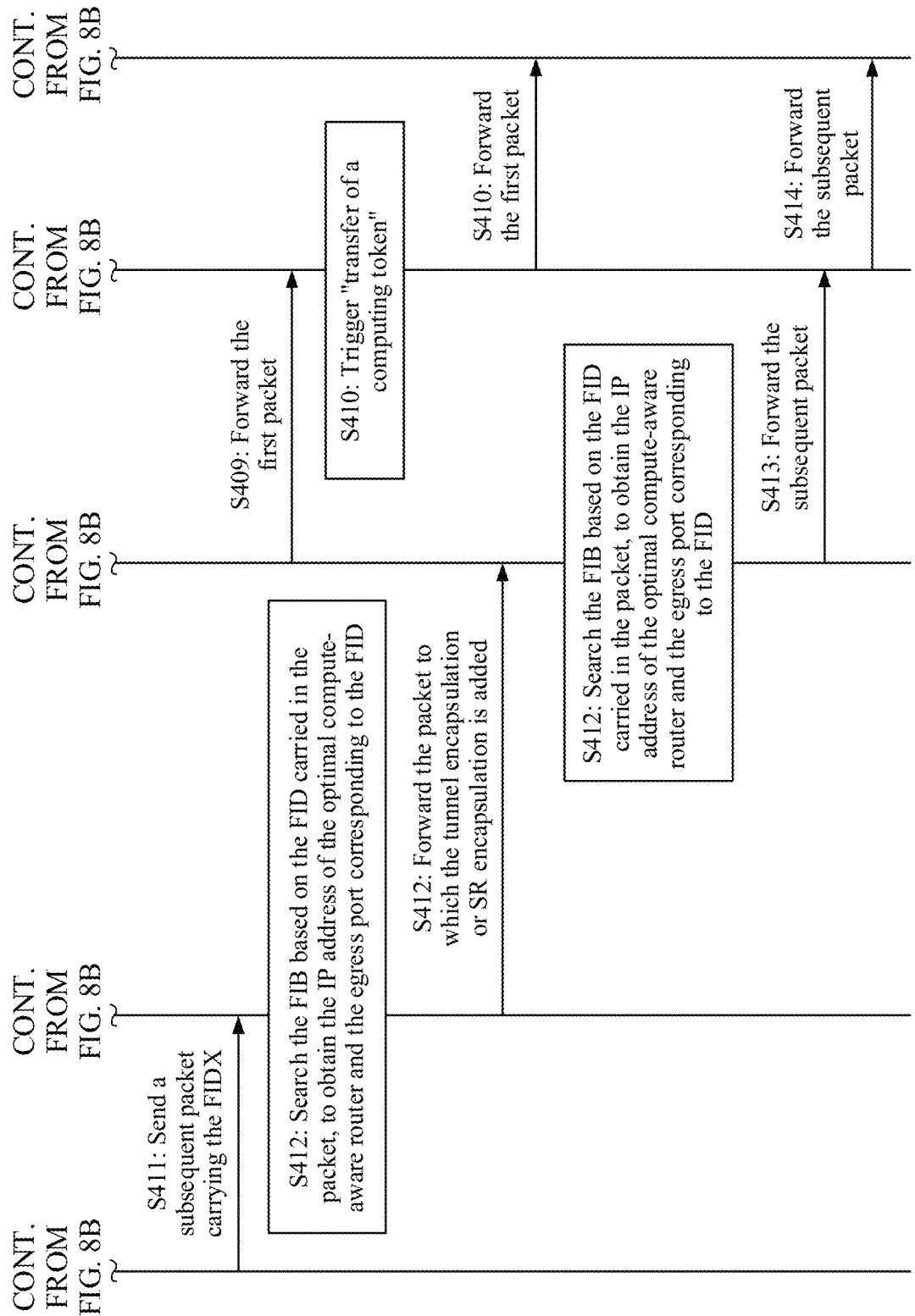

FIG. 8A, FIG. 8B, and FIG. 8C depict a flowchart of an embodiment of a compute-aware routing method according to this application. As shown in FIG. 8A, FIG. 8B, and FIG. 8C, both an ingress node of a compute-aware network (for example, an ingress compute-aware router or a second compute-aware router in FIG. 8A, FIG. 8B, and FIG. 8C) and an egress node of the compute-aware network (for example, an egress compute-aware router or a first compute-aware router in FIG. 8A, FIG. 8B, and FIG. 8C) select a route based on a computing metric, and perform forwarding based on an FID. Other routers can perform forwarding based on a conventional IP. Therefore, an investment of an existing IP router can be protected. The method in these embodiments may include the following steps:

S401 to S403 may be the same steps as detailed in S301 to S303. For details, refer to description in S301 to S303. Details are not described herein again.

S404: The first compute-aware router sends the compute-aware routing information to another compute-aware router in a network over the IGP/BGP.

In other words, in these embodiments, the compute-aware routing information sent by the first compute-aware router to another compute-aware router in the network over the IGP/BGP includes a computing code k and an IP address of the first compute-aware router.

S405: The first compute-aware router obtains a RIB entry including the FID, the computing code k, the IP address prefix, and the egress port.

A second compute-aware router obtains the RIB entry including the FID, the computing code k, the IP address of the first compute-aware router, and the egress port.

S406: A client sends a first packet carrying the FID.

For example, the first packet carries an FIDX.

S407: The second compute-aware router that receives the first packet searches an FIB based on the FID. If the second compute-aware router does not find an FIB entry corresponding to the FID, the second compute-aware router may search a RIB based on the FID. The second compute-aware router may then compare values of "the computing code 1 to the computing code k". The second compute-aware router may then calculate a route, to obtain an IP address of an optimal compute-aware router (for example, the first compute-aware router) and the egress port that correspond to the FID. The second compute-aware router may then generate an FIB entry that is forwarded based on the FID, where the FIB entry includes a correspondence between the FID, the IP address of the first compute-aware router, and the egress port.

S408: The second compute-aware router adds tunnel encapsulation to the packet by using the IP address of the compute-aware router as a tunnel destination address, or adds SR encapsulation to the packet by using the IP address of the compute-aware router as a segment identifier of SR; and forwards, to the first compute-aware router, the packet to which the tunnel encapsulation or SR encapsulation is added.

S409: The first compute-aware router forwards, to a leaf router K, the first packet sent by the second compute-aware router.

The leaf router K herein is a leaf router connected to the first compute-aware router.

S410: The leaf router K forwards the first packet to a computing container in which the FIDX is located, and triggers "transfer of a computing token."

S411: The client sends a subsequent packet carrying the FIDX to the second compute-aware router.

S412: The second compute-aware router searches the FIB based on the FID carried in the packet, to obtain the IP address of the optimal compute-aware router and the egress port that correspond to the FID. The second compute-aware router may then add tunnel encapsulation to the packet by using the IP address of the compute-aware router as the tunnel destination address, or adds SR encapsulation to the packet by using the IP address of the compute-aware router as the segment identifier of SR. The second compute-aware router may then forward, to the first compute-aware router, the packet to which the tunnel encapsulation or SR encapsulation is added.

S413: The first compute-aware router forwards, to the leaf router K, the packet sent by the second compute-aware router.

S414: The leaf router forwards the packet to the computing container in which the FID is located.

Figure 9A:
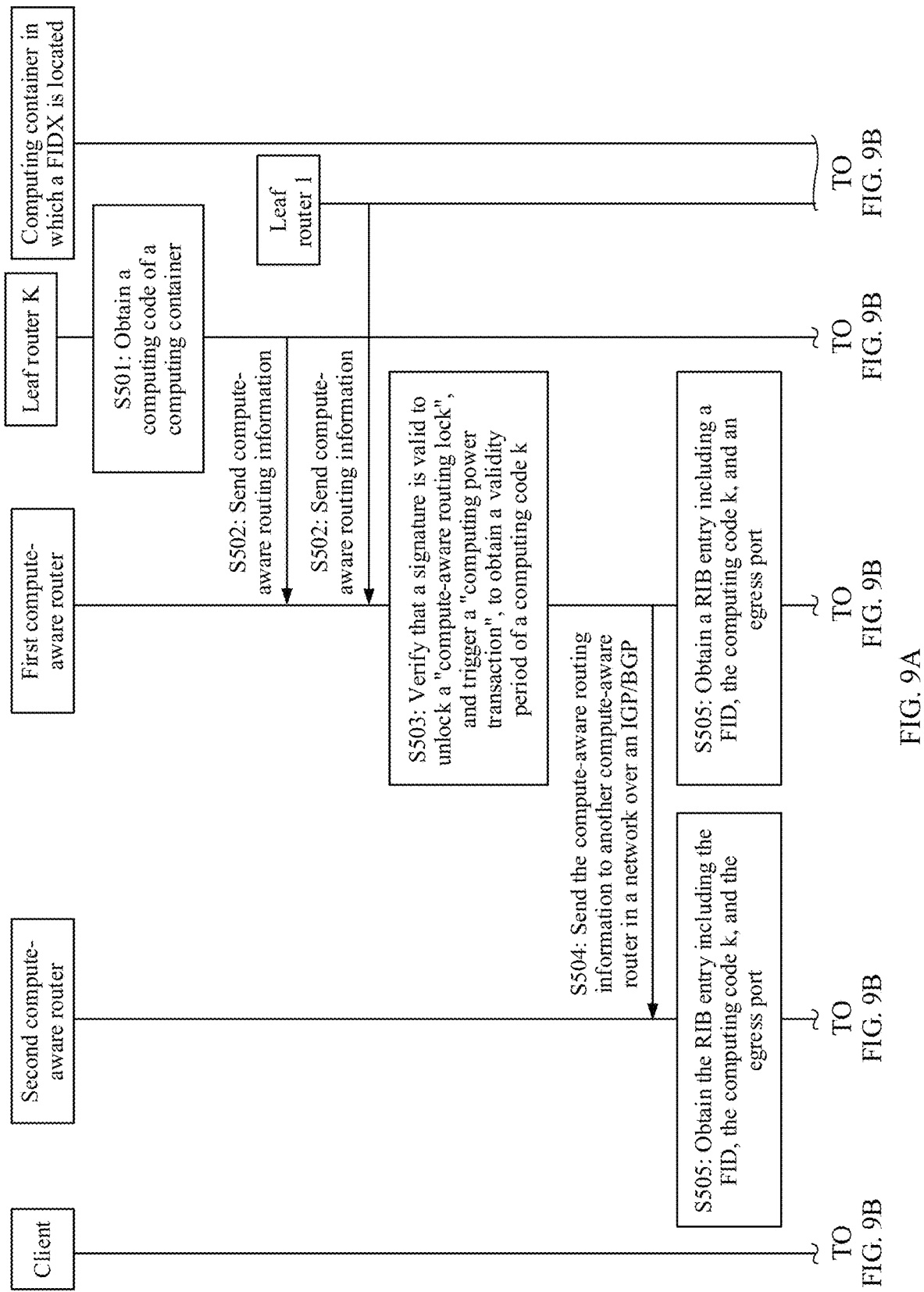
FIG. 9A, FIG. 9B, and FIG. 9C are a flowchart of an embodiment of a compute-aware routing method according to this application.
Figure 9B:
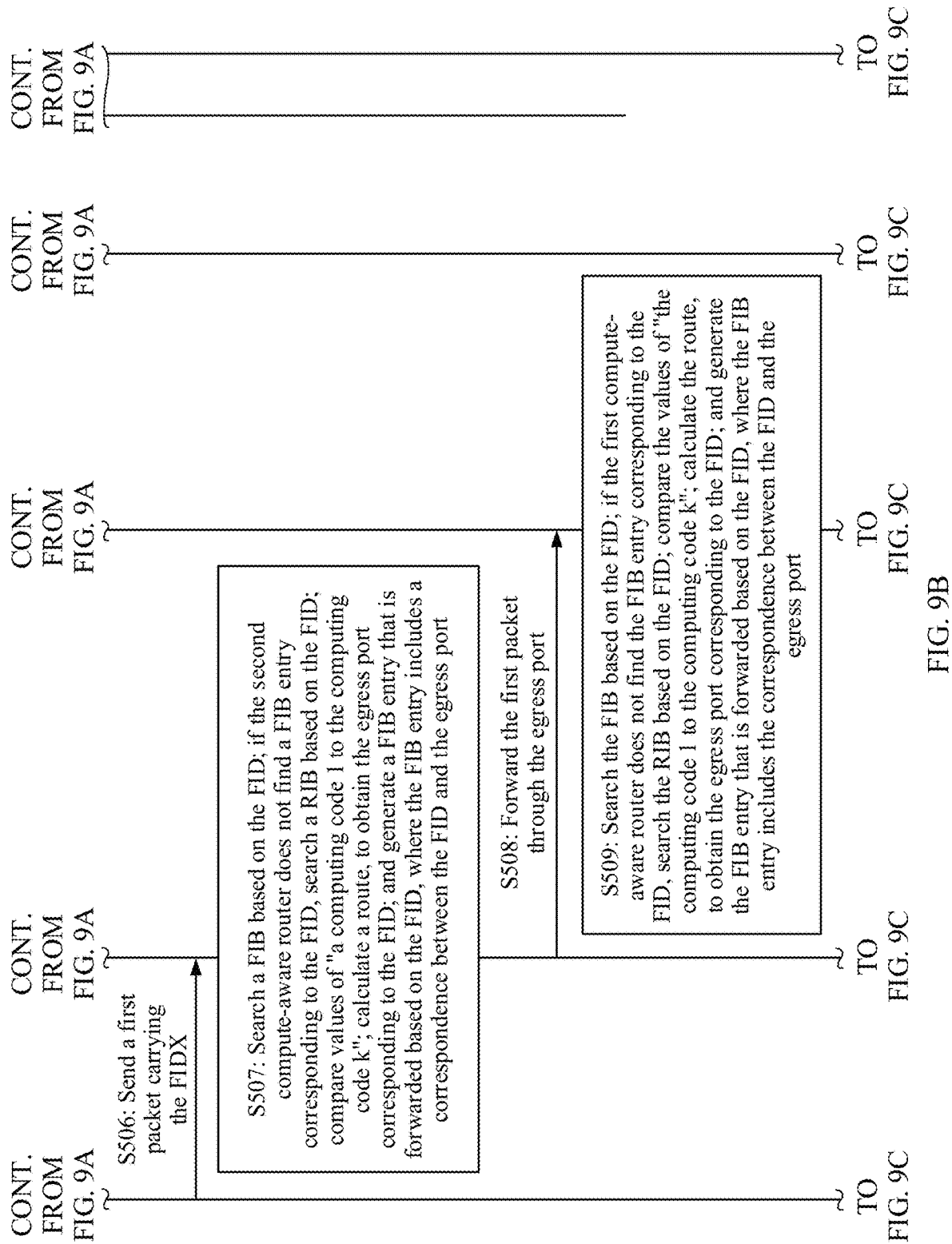
Figure 9C:
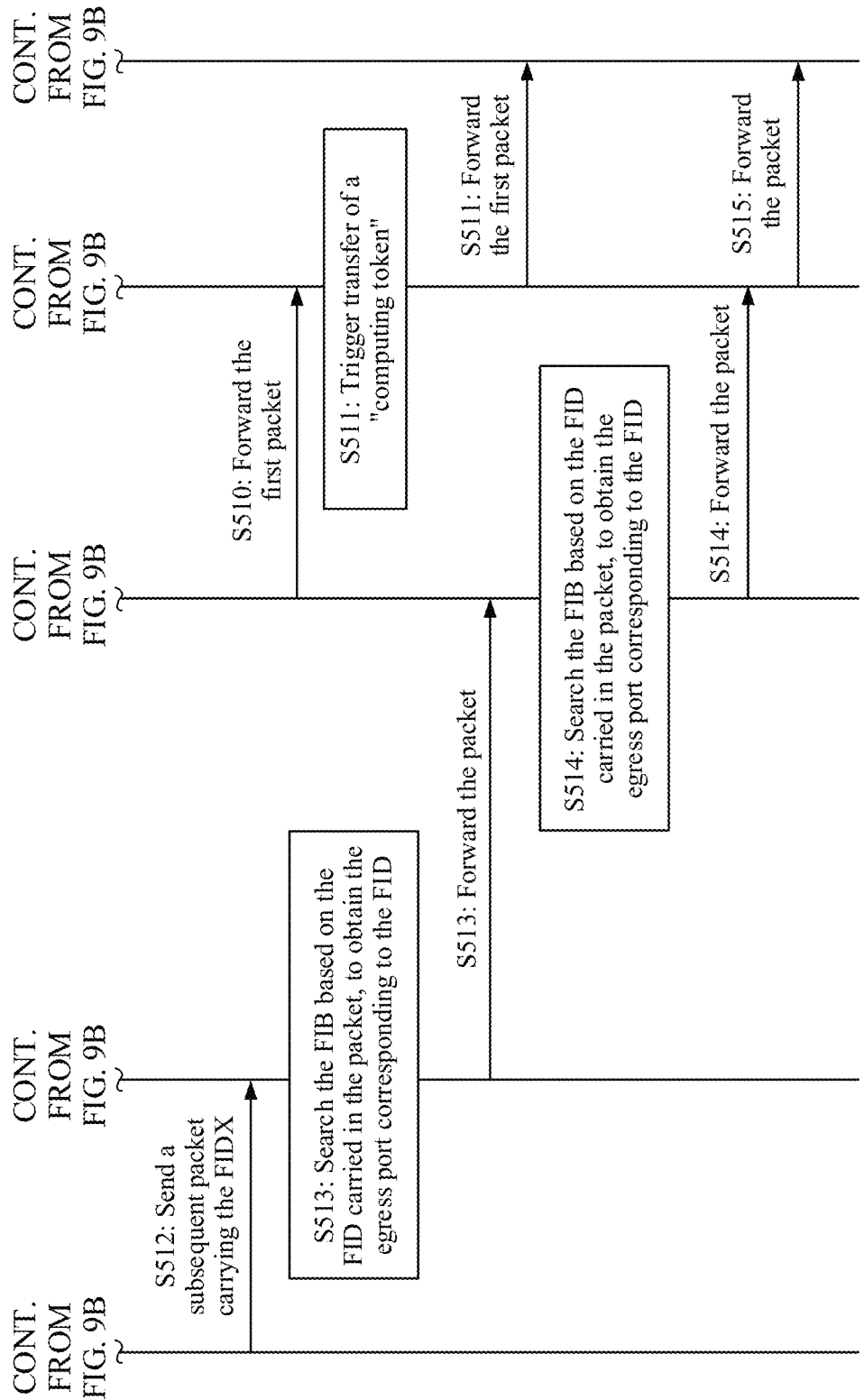
Figure 10A:
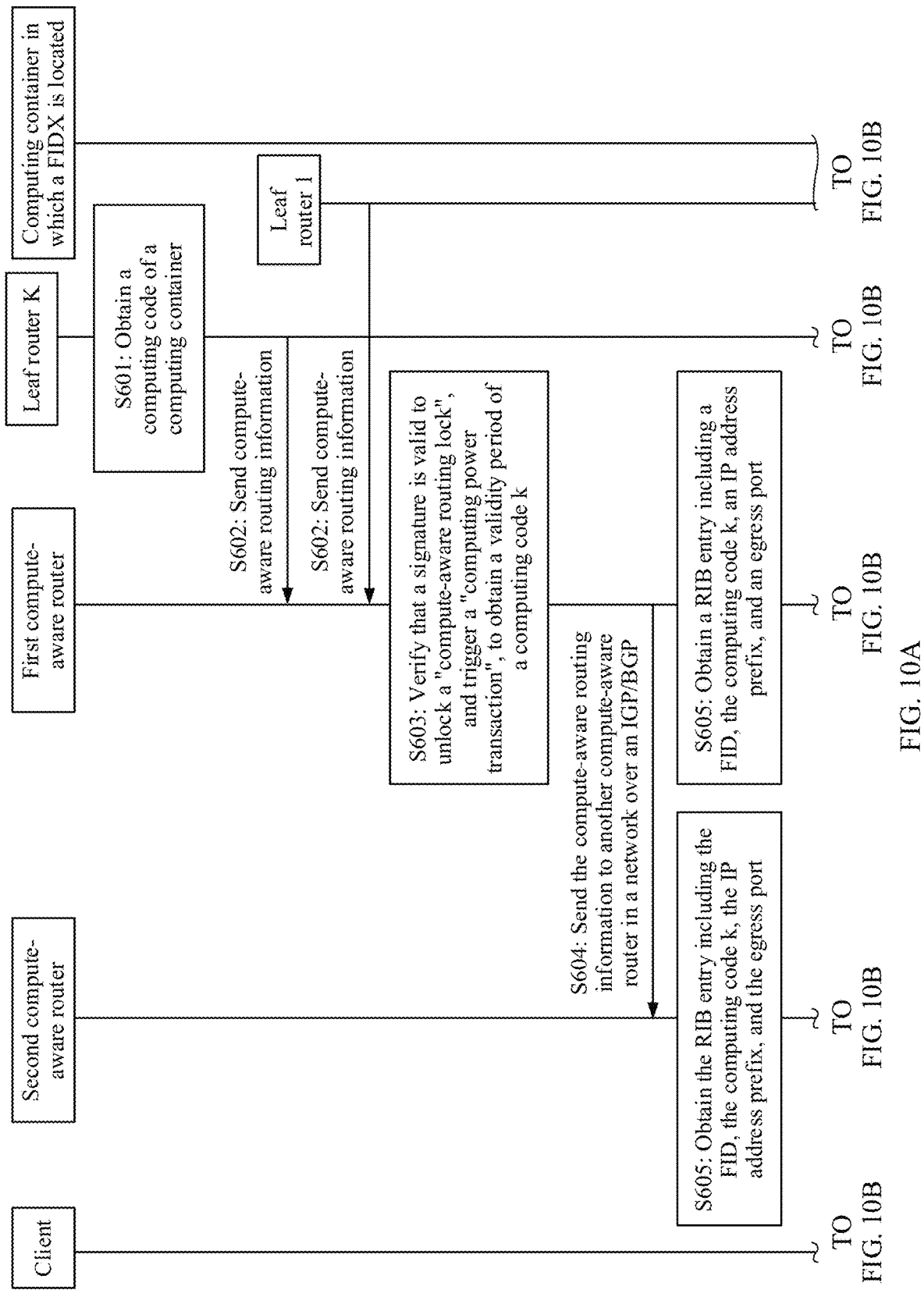
Figure 10C:
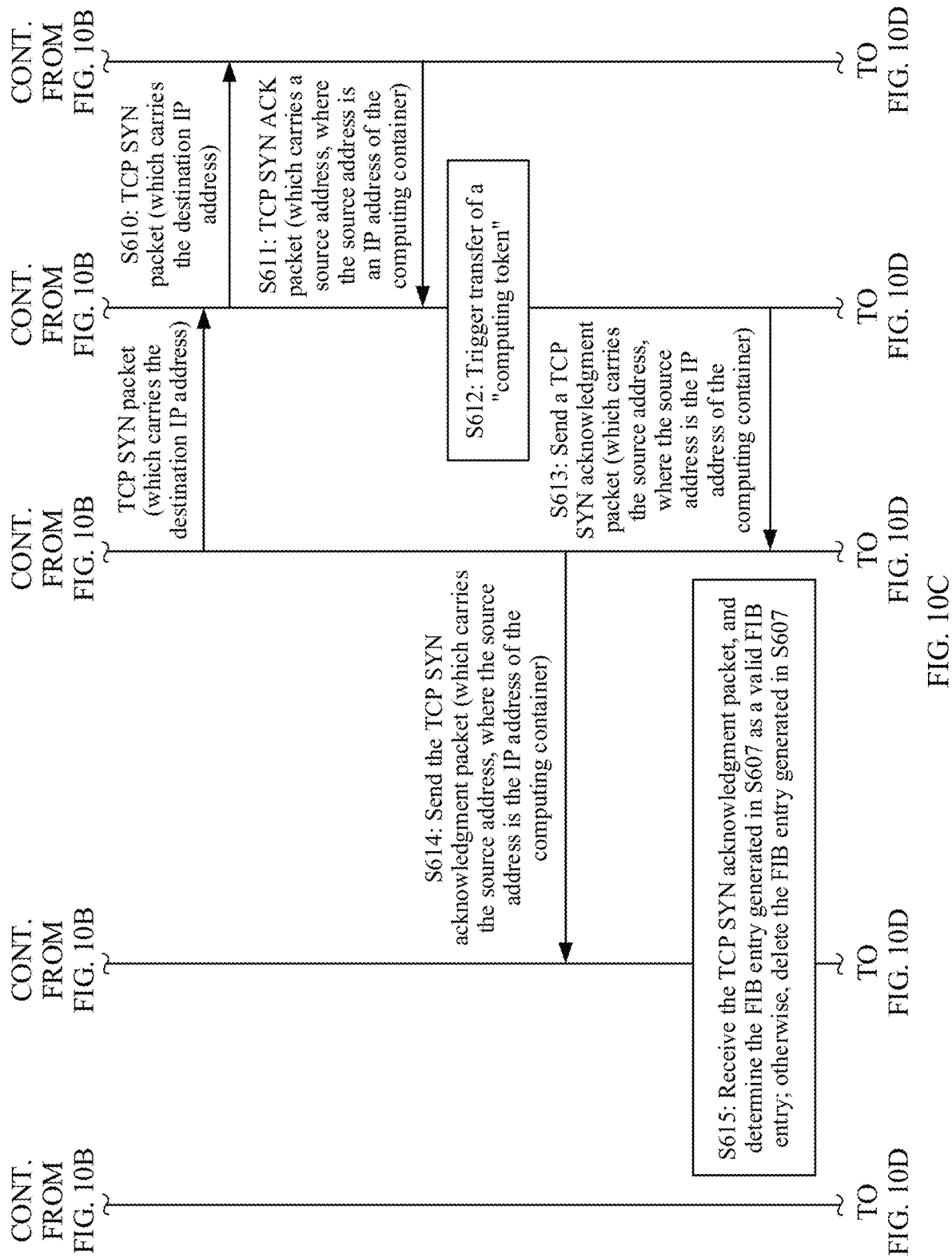
Figure 10D:
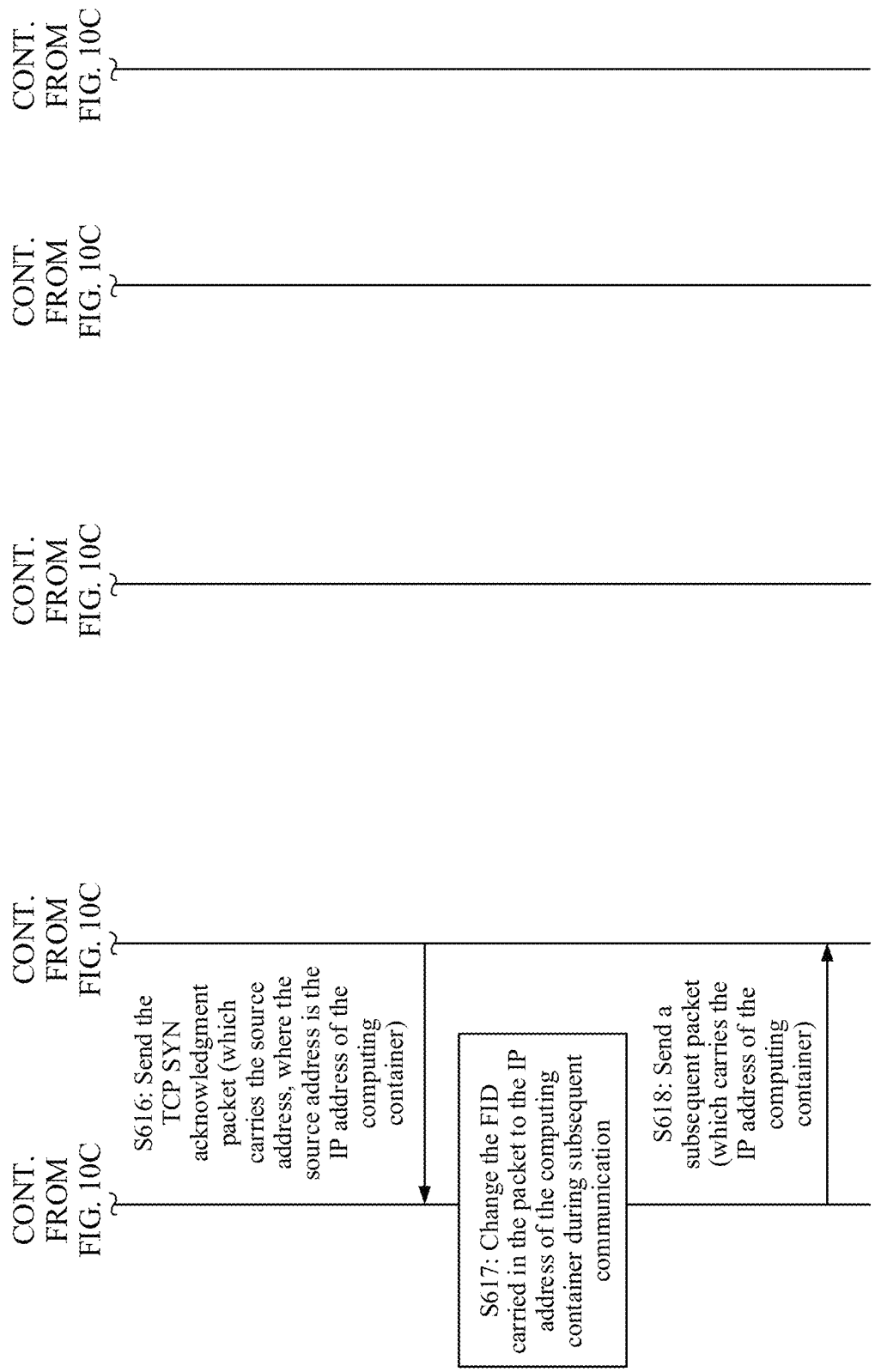

FIG. 9A, FIG. 9B, and FIG. 9C depict a flowchart of an embodiment of a compute-aware routing method according to this application. As shown in FIG. 9A, FIG. 9B, and FIG. 9C, the compute-aware routers in a compute-aware network are not limited to a first compute-aware router and a second compute-aware router depicted in FIG. 9A, FIG. 9B, and FIG. 9C. The compute-aware routers select a route based on a computing metric, and perform forwarding based on an FID. The method in these embodiments may include the following steps.

S501 is the same as S301, and details are not described herein again.

S502: The leaf router 1 and the leaf router K send, over an IGP/BGP, compute-aware routing information to a first compute-aware router connected to the leaf router K.

The compute-aware routing information includes an FID and a computing code k. If in S501, the leaf router calculates a computing metric based on the computing code, the compute-aware routing information includes the FID and a computing metric k. If the compute-aware routing information does not include the computing metric, the compute-aware router that receives the compute-aware routing information calculates the computing metric based on the computing code.

S503: The first compute-aware router verifies that a signature is valid to a contract platform or a related department to unlock a "compute-aware routing lock", and triggers a "computing power transaction", to obtain a validity period of the computing code k.

The validity period of the computing code k is a valid time that the computing code k can be used.

S504: The first compute-aware router sends the compute-aware routing information, including the computing code k, to another compute-aware router in a network over the IGP/BGP.

S505: The first compute-aware router obtains a RIB entry including the FID, the computing code k, and an egress port.

A second compute-aware router obtains the RIB entry including the FID, the computing code k, and the egress port.

S506: A client sends a first packet carrying the FID.

For example, the first packet carries a FIDX.

S507: The second compute-aware router that receives the first packet searches a FIB based on the FID. If the second compute-aware router does not find a FIB entry corresponding to the FID, the second compute-aware router searches a RIB based on the FID. The second compute-aware router may then compare values of "a computing code 1 to the computing code k." The second compute-aware router may then calculate a route, to obtain the egress port corresponding to the FID The second compute-aware router may then generate a FIB entry that is forwarded based on the FID, where the FIB entry includes a correspondence between the FID and the egress port.

S508: The second compute-aware router forwards the first packet through the egress port, and after being forwarded by several similar compute-aware routers, the first packet arrives at the first compute-aware router (e.g., an egress of the compute-aware network).

S509: The first compute-aware router searches the FIB based on the FID. If the first compute-aware router does not find the FIB entry corresponding to the FID, the first compute-aware router searches the RIB based on the FID. The first compute-aware router may then compare the values of "the computing code 1 to the computing code k". The first compute-aware router may then calculate the route, to obtain the egress port corresponding to the FID. The first compute-aware router may then generate the FIB entry that is forwarded based on the FID, where the FIB entry includes the correspondence between the FID and the egress port.

S510: The first compute-aware router forwards the first packet to the leaf router K through the egress port.

The leaf router K herein is a leaf router connected to the first compute-aware router.

S511: The leaf router K forwards the first packet to a computing container in which the FID is located, and triggers transfer of a "computing token".

S512: The client sends a subsequent packet carrying the FIDX to the second compute-aware router.

S513: The second compute-aware router searches the FIB based on the FID carried in the packet, to obtain the egress port corresponding to the FID; and forwards the packet to the first compute-aware router.

S514: The first compute-aware router searches the FIB based on the FID carried in the packet, to obtain the egress port corresponding to the FID; and forwards the packet to the leaf router K.

The leaf router K herein is a leaf router connected to the first compute-aware router.

S515: The leaf router K forwards the packet to the computing container in which the FID is located.

FIG. 10A, FIG. 10B, FIG. 10C, and FIG. 10D depict a flowchart of an embodiment of a compute-aware routing method according to this application. As shown in FIG. 10A, FIG. 10B, FIG. 10C, and FIG. 10D, on the basis of the method shown in FIG. 7A, FIG. 7B, and FIG. 7C, when a first packet is a transmission control protocol (TCP) packet, for example a TCP synchronization (SYN) packet, the method in these embodiments may include the following steps:

S601 is the same as S301, and details are not described herein again.

S602: The leaf router 1 and the leaf router K send, over an IGP/BGP, compute-aware routing information to a first compute-aware router connected to the leaf router K.

The compute-aware routing information includes an FID, an IP address prefix of the computing container in which the leaf router is located, and the computing code k. If in S101, the leaf router calculates the computing metric based on the computing code, the compute-aware routing information includes the FID, the IP address prefix of the computing container in which the leaf router is located, and the computing metric k. If the compute-aware routing information does not include the computing metric, the compute-aware router that receives the compute-aware routing information calculates the computing metric based on the computing code.

S603: The first compute-aware router verifies that a signature is valid to a contract platform or a related department to unlock a "compute-aware routing lock", and triggers a "computing power transaction", to obtain a validity period of the computing code k.

The validity period of the computing code k is a valid time that the computing code k can be used.

S604: The first compute-aware router sends the compute-aware routing information to another compute-aware router in a network over the IGP/BGP.

All compute-aware routers in the network obtain each computing code k, an IP address prefix and an FID that correspond to the computing code k, and the validity period of the computing code k. A RIB is generated based on the foregoing information. The RIB includes a correspondence between the computing code k, the IP address prefix, the FID, and an egress port.

S605: The first compute-aware router obtains a RIB entry including the FID, the computing code k, the IP address prefix, and the egress port.

A second compute-aware router obtains the RIB entry including the FID, the computing code k, the IP address prefix, and the egress port.

S606: A client sends a first packet, where a type of the first packet is TCP SYN, and the first packet carries a FIDX.

S607: The second compute-aware router that receives the first packet searches a FIB based on the FID, If the second compute-aware router does not find a FIB entry corresponding to the FID, the second compute-aware router searches the RIB based on the FID. The second compute-aware router may then compare values of "the computing code 1 to the computing code k". The second compute-aware router may then calculate a route, to obtain a destination IP address prefix and an egress port that correspond to the FID. The second compute-aware router may then generate a FIB entry that is forwarded based on the FID, where the FIB entry includes a correspondence between the FID, the IP address prefix, and the egress port.

S608: The second compute-aware router adds the destination IP address prefix corresponding to the FID to the FID, to obtain a destination IP address, and forwards the TCP SYN packet to the first compute-aware router based on the destination IP address, where the forwarded TCP SYN packet carries the destination IP address.

The destination IP address is an IP address of a computing container in which the FID is located.

S609: The first compute-aware router forwards, based on the destination IP address, the TCP SYN packet carrying the destination IP address to the leaf router K.

The leaf router K herein is a leaf router connected to the first compute-aware router.

S610: The leaf router K forwards, based on the destination IP address, the TCP SYN packet to the computing container in which the FID is located.

S611: The computing container in which the FID is located sends a TCP SYN acknowledgment packet to the leaf router K, where a source address carried in the acknowledgment packet is an IP address of the computing container.

S612: The leaf router K triggers transfer of a "computing token".

In these embodiments, transfer of the computing token is triggered only when the TCP SYN ACK packet is received, to ensure that transfer of the computing token is triggered only when a TCP connection or another session connection is correctly established.

S613: The leaf router K sends the TCP SYN acknowledgment packet to the first compute-aware router, where the source address carried in the acknowledgment packet is the IP address of the computing container.

S614: The first compute-aware router sends the TCP SYN acknowledgment packet to the second compute-aware router, where the source address carried in the acknowledgment packet is the IP address of the computing container.

S615: The second compute-aware router receives the TCP SYN acknowledgment packet, and determines the FIB entry generated in S607 as a valid FIB entry. If the TCP SYN acknowledgment packet is not received, the FIB entry generated in S607 is deleted. This indicates that a TCP session fails to be established. If the TCP session or a consumer session connection fails to be established (which usually indicates that a computing site or a related computing path is faulty), a compute-aware routing service cannot be provided for subsequent packets.

S616: The second compute-aware router sends the TCP SYN acknowledgment packet to the client, where the source address carried in the acknowledgment packet is the IP address of the computing container.

S617: The client changes the FID carried in the packet to the IP address of the computing container during subsequent communication.

S618: The client sends a subsequent packet to the second compute-aware router, where the subsequent packet carries the IP address of the computing container.

Figure 11:
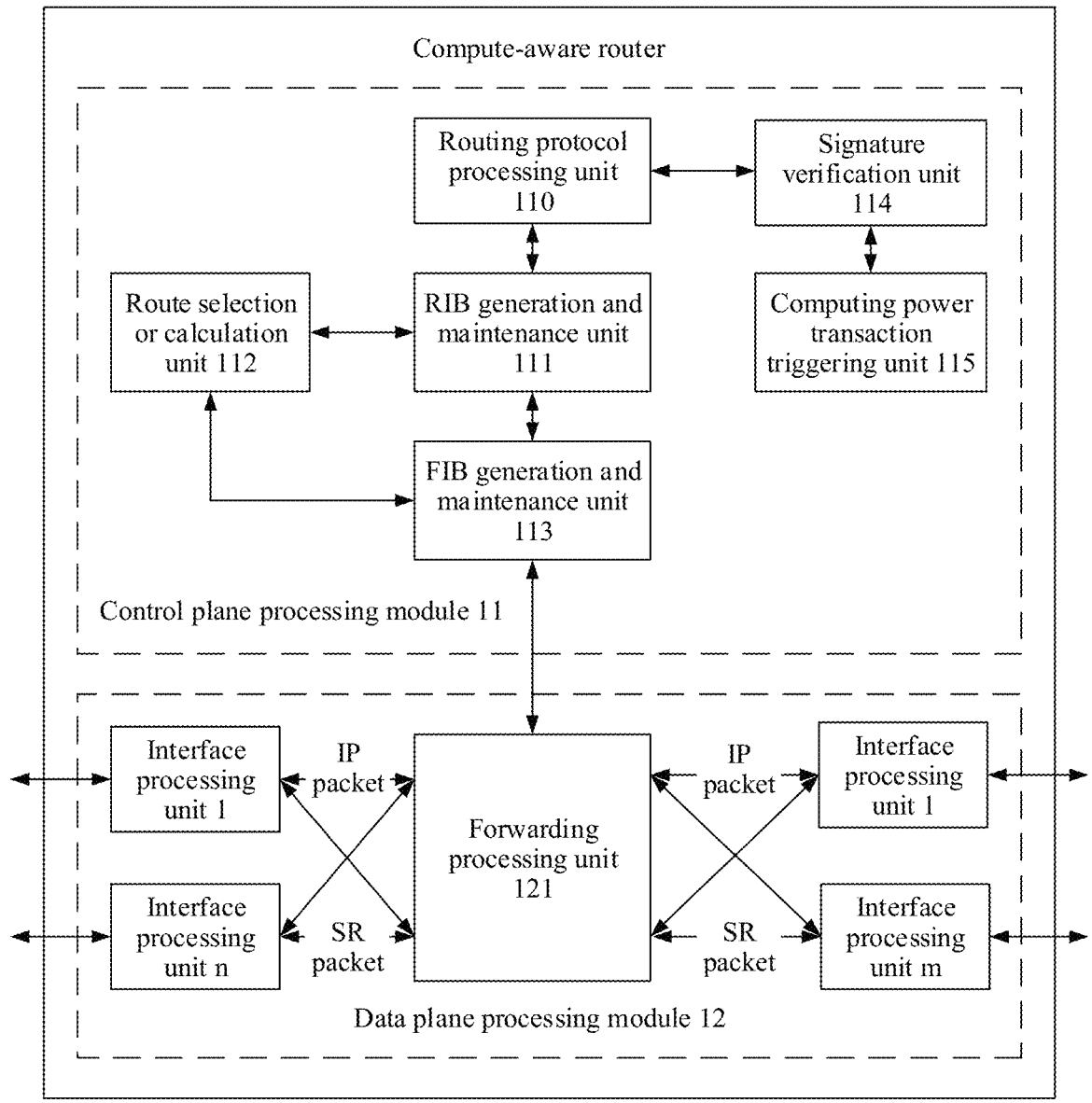
FIG. 11 is a schematic diagram of a function structure of a compute-aware router according to an embodiment of this application.

Network elements in this application include a compute-aware router and a leaf router. FIG. 11 is a schematic diagram of a function structure of a compute-aware router according to an embodiment of this application. As shown in FIG. 11, the compute-aware router includes a control plane processing module 11 and a data plane processing module 12. The control plane processing module 11 includes a routing protocol processing unit 110, a RIB generation and maintenance unit 111, a route selection or calculation unit 112, a FIB generation and maintenance unit 113, a signature verification unit 114, and a computing power transaction triggering unit 115. The data plane processing module 12 includes a forwarding processing unit 121 and a plurality of interface processing units.

The routing protocol processing unit 110 is configured to advertise a function and/or computing power. In other words, the routing protocol processing unit 110 advertises, to another compute-aware router, a computing resource of a computing container, and/or a function that can be provided by the computing container, and an IP address prefix/address of the computing container in which the function is located. This enables another compute-aware router in a compute-aware network to find the function and/or the computing power. Optionally, the IP address prefix is advertised. The computing resource is expressed in a form of a "computing code" in these embodiments of this application. Compute-aware routing information may include the computing resource of the computing container, and/or the function that can be provided by the computing container, and the IP address prefix/address of the computing container in which the function is located. Optionally, the compute-aware routing information may alternatively include an IP address prefix/address of a leaf router or an IP address prefix/address of a compute-aware router connected to a leaf router. Advertisement may be implemented by using an extended DC interior protocol or an extended routing protocol (for example, an IGP/BGP).

The signature verification unit 114 is configured to interact with a contract platform to verify authenticity of a signature of the "computing code". Optionally, the signature verification unit 114 obtains a validity period of renting computing power. If authenticity of the signature is successfully verified, the signature verification unit 114 unlocks a compute-aware routing "lock", and allows the "computing code" to be transferred to another compute-aware router.

The computing power transaction triggering unit 115 is configured to trigger a "computing power transaction", for example, trigger transfer of a "computing token". For example, because a compute-aware router steers traffic and has started a service, the contract platform is triggered to transfer a "computing token" to a consumer of computing power.

The RIB generation and maintenance unit 111 is configured to generate a RIB entry based on the compute-aware routing information. The RIB entry includes an FID, a corresponding computing metric, and a corresponding IP address prefix and egress port. Alternatively, the RIB entry includes an FID, a corresponding computing metric, an IP address of a corresponding egress compute-aware router or an IP address of the leaf router, and an egress port.

The route selection or calculation unit 112 is configured to select or calculate a route based on the "computing metric" of the RIB, to obtain a destination IP address prefix and the egress port that correspond to the FID, or obtain an IP address of an optimal egress compute-aware router corresponding to the FID or the IP address of the leaf router, the egress port, and a validity period of the computing code, that is, load balancing between sites is implemented.

The FIB generation and maintenance unit 113 is configured to generate a FIB entry based on a processing result of the route selection or calculation unit 112. The FIB entry includes the FID, and the corresponding IP address prefix and egress port. Alternatively, the FIB entry includes the FID, the IP address of the corresponding egress compute-aware router or the IP address of the leaf router, and the egress port.

The forwarding processing unit 121 is configured to directly perform IP forwarding when a packet carries a valid IP destination address. The forward processing unit 121 is further configured to search a FIB based on the FID carried in the packet, to obtain the egress port, and perform forwarding through the egress port; or to search a FIB based on the FID carried in the packet, to obtain the IP address prefix, add the IP address prefix to the FID, to obtain a destination IP address, and perform forwarding based on the destination IP address.

The interface processing unit is configured to perform input or output processing of the interface.

Figure 12:
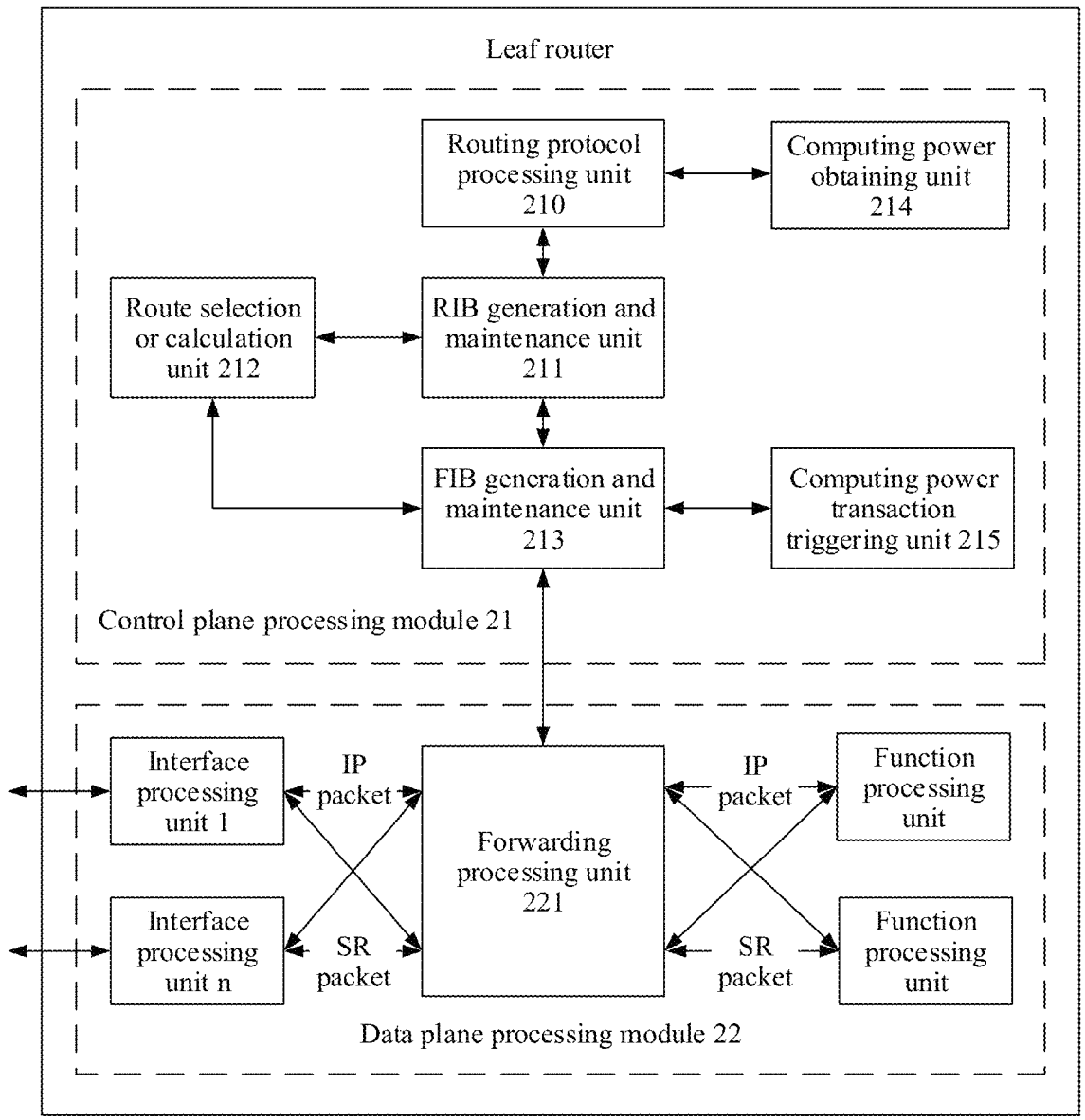
FIG. 12 is a schematic diagram of a function structure of a leaf router according to an embodiment of this application.

FIG. 12 is a schematic diagram of a function structure of a leaf router according to an embodiment of this application. The leaf router may exist in a form of a software device (for example, a virtual router) or a hardware device. As shown in FIG. 12, the leaf router includes a control plane processing module 21 and a data plane processing module 22. The control plane processing module 21 includes a routing protocol processing unit 210, a computing power obtaining unit 214, and a computing power transaction triggering unit 215. The data plane processing module 22 includes a forwarding processing unit 221, a plurality of interface processing units, and a plurality of function processing units.

The routing protocol processing unit 210 is configured to advertise a function and/or computing power. In other words, the routing protocol processing unit 210 advertises, to another compute-aware router, a computing resource of a site, and/or a function that can be provided by the site, and an IP address prefix/address of a computing container in which the function is located, to enable another compute-aware router in a compute-aware network to find the function and/or the computing power. Optionally, the IP address prefix is advertised. The computing resource is expressed in a form of a "computing code" in this specification. Compute-aware routing information includes the computing resource of the site, and/or the function that can be provided by the site, and the IP address prefix/address of the computing container in which the function is located. The computing routing information may further include an IP address prefix/address of a leaf router. Advertisement may be implemented by using an extended DC interior protocol or an extended routing protocol (for example, an IGP/BGP).

The computing power obtaining unit 214 is configured to obtain a "computing code" signed by using a private key and a list of possible function IDs to provide a service, that is, perform function discovery and computing resource discovery. The "computing code" is usually provided by IT software, and the "computing code" is discussed in detail below.

The computing power transaction triggering unit 215 is configured to trigger a "computing power transaction", for example, trigger transfer of a "computing token". For example, because traffic has been steered to a leaf router corresponding to the site, a contract platform is triggered to transfer a "computing token" to a consumer of computing power.

Optionally, the control plane processing module 21 further includes a RIB generation and maintenance unit 211, a route selection or calculation unit 212, and a FIB generation and maintenance unit 213. The RIB generation and maintenance unit 211 is configured to generate a RIB entry based on the compute-aware routing information. The RIB entry includes the function ID, a corresponding computing metric, a corresponding IP address prefix, and an egress port.

The route selection or calculation unit 212 is configured to select or calculate a route based on the "computing metric" of the RIB, to obtain an optimal destination IP address prefix and a virtual egress port that correspond to the function ID. Optionally, the route selection or calculation unit 212 is configured to select a computing resource in the site or a domain controller (DC), that is, implement load balancing in the site or a server.

The FIB generation and maintenance unit 213 is configured to generate a corresponding FIB entry based on a processing result of the route selection or calculation unit. The FIB entry includes the function ID, the corresponding IP address prefix, and the virtual egress port.

The forwarding processing unit 221 is configured to directly perform IP forwarding when a packet carries a valid IP destination address; or search the FIB based on the function ID carried in the packet, to obtain the virtual egress port, and perform forwarding through the virtual egress port to a corresponding function processing unit.

The interface processing unit is configured to perform input or output processing of the interface.

The function processing unit is configured to perform a calculation, a service, or program processing corresponding to the function. In these embodiments, it is assumed that the leaf router runs in a form of a virtual router software, and the leaf router is connected to the function through the virtual egress port.

Figure 13:
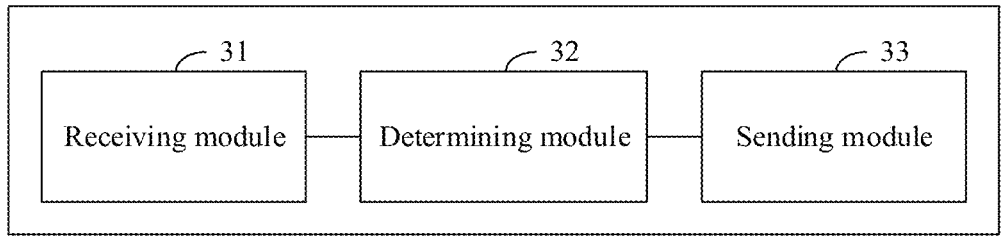
FIG. 13 is a schematic diagram of an embodiment of a structure of a compute-aware routing apparatus according to this application.

FIG. 13 is a schematic diagram of an embodiment of a structure of a compute-aware routing apparatus according to this application. As shown in FIG. 13, the apparatus in these embodiments may include a receiving module 31, a determining module 32, and a sending module 33.

The receiving module 31 is configured to receive compute-aware routing information of at least one computing container, where the compute-aware routing information includes a computing code or a computing metric.

The determining module 32 is configured to determine a routing information base (RIB) based on the compute-aware routing information, where the RIB includes either a function identifier FID of a function that can be provided by the computing container or an IP address prefix of the computing container in which the function is located and either one of the computing code or the computing metric, and the function includes any one of a software-defined computing program, function program, service software, or microservice that is deployed in the computing container.

The receiving module 31 is further configured to receive a packet.

The sending module 33 is configured to forward the packet based on a forwarding information base (FIB), where the FIB is determined based on the RIB, and the FIB includes the FID or the IP address prefix.

Further, the sending module 33 is further configured to: send the compute-aware routing information to another compute-aware router in a network.

Further, when the compute-aware router does not find, in the FIB, a FIB entry corresponding to the packet, the determining module 32 is further configured to: determine, based on the computing code or the computing metric in the RIB, the FIB entry corresponding to the packet.

Further, the RIB may include various elements in different configurations such as (1) the FID, the computing metric, the IP address prefix, and an egress port; (2) the FID, the computing code, the IP address prefix, and an egress port; (3) the FID, the computing metric, an IP address of the compute-aware router, and an egress port; (4) the FID, the computing code, an IP address of the compute-aware router, and an egress port; (5) the IP address prefix, the computing metric, and the egress port; (6) the IP address prefix, the computing code, and an egress port; (7) the FID, the computing metric, and the egress port; or (8) the FID, the computing code, and an egress port. The FIB of these embodiments may include various elements in different configuration such as (1) the FID, the IP address prefix, and the egress port; (2) the FID, the IP address of the compute-aware router, and the egress port; or (3) the FID and the egress port.

Further, if the packet carries the FID, the sending module is configured to: search the FIB for the IP address prefix and the egress port that correspond to the FID; and add the IP address prefix corresponding to the FID to the FID, to obtain a destination IP address, and forward the packet based on the destination IP address; or search the FIB for the IP address of the compute-aware router and the egress port that correspond to the FID; add tunnel encapsulation to the packet by using the IP address of the compute-aware router as a tunnel destination address, or add SR encapsulation to the packet by using the IP address of the compute-aware router as a segment identifier of SR; and forward the packet to which the tunnel encapsulation or SR encapsulation is added; or search the FIB for the egress port corresponding to the FID or the IP address prefix; and forward the packet through the egress port.

The apparatus in these embodiments may be configured to execute the technical solutions of the method embodiment shown in FIG. 5. Implementation principles and technical effects are similar. Details are not described herein again.

Figure 14:
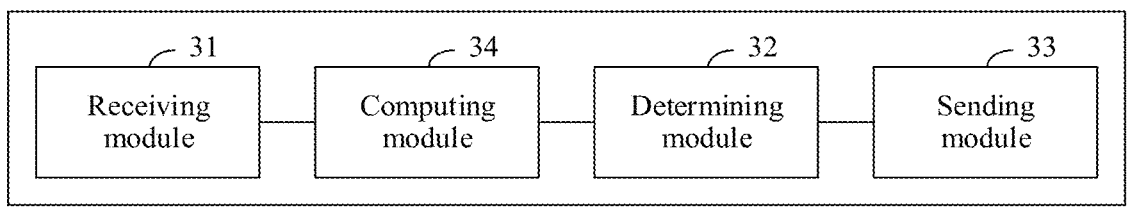
FIG. 14 is a schematic diagram of an embodiment of a structure of a compute-aware routing apparatus according to this application.

FIG. 14 is a schematic diagram of an embodiment of a structure of a compute-aware routing apparatus according to this application. As shown in FIG. 14, on the basis of the apparatus shown in FIG. 13, computing code includes an evaluated computing delay value and/or a computing capacity level, a machine type or a weighted value α2 related to machine type, and a server load. When the compute-aware routing information includes a computing code, the apparatus in these embodiments may further include a computing module 34. The computing module 34 is configured to calculate a computing metric based on the computing code and the following formula:

$$\text{computing metric} = \frac{\alpha 2 \times \text{computing capacity level}}{1 - \beta 2 \times \text{server load}} +$$

-continued $$\text{computing metric} = \frac{\alpha 2 \times \text{computing capacity level}}{1 - \beta 2 \times \text{server load}};$$

or computing metric = $\gamma 2 \times$ evaluated computing delay value, where

β2 and γ2 are weighted values.

The apparatus in these embodiments may be configured to execute the technical solutions of the method embodiment shown in FIG. 5. Implementation principles and technical effects are similar. Details are not described herein again.

Figure 15:
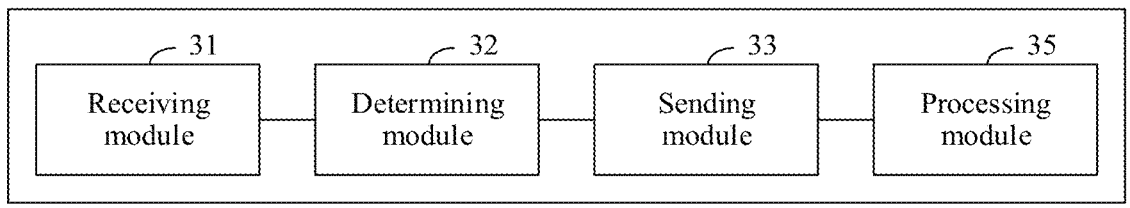
FIG. 15 is a schematic diagram of an embodiment of a structure of a compute-aware routing apparatus according to this application.

FIG. 15 is a schematic diagram of an embodiment of a structure of a compute-aware routing apparatus according to this application. As shown in FIG. 15, on the basis of the structure of the apparatus shown in FIG. 13, the apparatus in these embodiments may further include a processing module 35. The processing module 35 is configured to: if the receiving module receives a response packet, determine a FIB entry as a valid FIB entry; and if the receiving module does not receive the response packet, delete the FIB entry.

The apparatus in these embodiments may be configured to execute the technical solutions of the method embodiment shown in FIG. 5. Implementation principles and technical effects are similar. Details are not described herein again.

Figure 16:
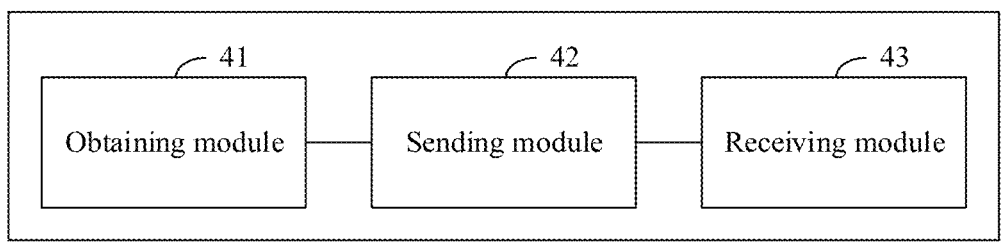
FIG. 16 is a schematic diagram of an embodiment of a structure of a compute-aware routing apparatus according to this application.

FIG. 16 is a schematic diagram of an embodiment of a structure of a compute-aware routing apparatus according to this application. As shown in FIG. 16, the apparatus in these embodiments may include an obtaining module 41, a sending module 42, and a receiving module 43.

The obtaining module 41 is configured to obtain a computing code of a computing container, where a leaf router is deployed in the computing container.

The sending module 42 is configured to send compute-aware routing information of the computing container to a compute-aware router connected to the leaf router, to enable the compute-aware router to send the compute-aware routing information to another compute-aware router in a network, where the compute-aware routing information includes the computing code or a computing metric.

The receiving module 43 is configured to receive a packet.

The sending module 42 is further configured to forward the packet.

Optionally, the obtaining module 41 is further configured to: obtain the computing code from the computing container and/or a measurement tool, where the computing code includes an evaluated computing delay value and/or a computing capacity level, a machine type or a weighted value α2 related to machine type, and a server load, and the evaluated computing delay value is measured by the measurement tool.

The apparatus in these embodiments may be configured to execute the technical solutions of the method embodiment shown in FIG. 6. Implementation principles and technical effects are similar. Details are not described herein again.

Figure 17:
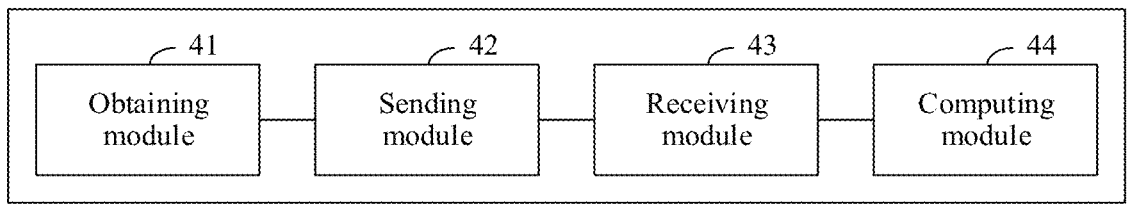
FIG. 17 is a schematic diagram of an embodiment of a structure of a compute-aware routing apparatus according to this application.

FIG. 17 is a schematic diagram of an embodiment of a structure of a compute-aware routing apparatus according to this application. As shown in FIG. 17, on the basis of the structure of the apparatus shown in FIG. 16, if compute-aware routing information includes a computing metric, the apparatus in these embodiments may further include a computing module 44. The computing module 44 is configured to calculate the computing metric based on a computing code and the following formula:

$$\text{computing metric} = \frac{\alpha 2 \times \text{computing capacity level}}{1 - \beta 2 \times \text{server load}} +$$

$$\gamma 2 \times \text{evaluated computing delay value};$$

$$\text{computing metric} = \frac{\alpha 2 \times \text{computing capacity level}}{1 - \beta 2 \times \text{server load}};$$

or computing metric = $\gamma 2 \times$ evaluated computing delay value, where

β2 and γ2 are weighted values.

Optionally, the computing module 44 is further configured to: calculate a computing token based on the computing code and the following formula:

$$\text{computing token} = \alpha 1 \times [\beta 1 - (\text{computing metric})],$$

where

α1 and β1 are computing power pricing coefficients.

Optionally, the compute-aware routing information further includes: FID of a function that can be provided by the computing container, and an IP address prefix or an IP address of the computing container in which the function is located, where the function comprises a software-defined computing program, function program, service software, or microservice that is deployed in the computing container.

The apparatus in these embodiments may be configured to execute the technical solutions of the method embodiment shown in FIG. 6. Implementation principles and technical effects are similar. Details are not described herein again.

In this application, the compute-aware routing apparatus may be divided into function modules based on the foregoing method examples. For example, function modules corresponding to functions may be obtained through division, or two or more functions may be integrated into one processing module. The integrated module may be implemented in a form of hardware, or may be implemented in a form of a software functional module. It should be noted that, in the embodiments of this application, module division is used as an example, and is merely a logical function division. During actual implementation, another division manner may be used.

Figure 18:
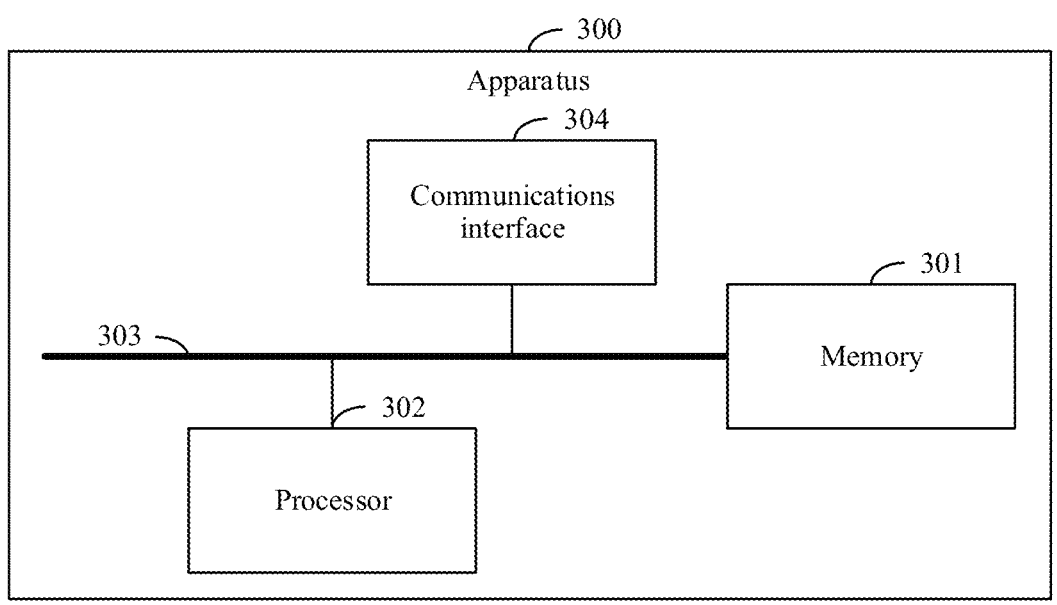
FIG. 18 is a schematic diagram of a structure of an apparatus according to this application.

FIG. 18 is a schematic diagram of a structure of an apparatus 300 according to an embodiment of this application. As shown in FIG. 18, the apparatus 300 includes a memory 301 and a processor 302.

The memory 301 is configured to store a computer program.

The processor 302 is configured to execute the computer program stored in the memory, and to implement the compute-aware routing method in the foregoing embodiments. For details, refer to related description in the foregoing method embodiments.

Optionally, the memory 301 may be independent of the processor 302, or may be integrated with the processor 302.

When the memory 301 is a device independent of the processor 302, the apparatus 300 may further include: a bus 303, configured to connect the memory 301 and the processor 302.

Optionally, these embodiments further include a communications interface 304. The communications interface 304 may be connected to the processor 302 by using the bus 303. The processor 302 may control the communications interface 304 to implement the foregoing receiving and sending functions of the apparatus 300.

The apparatus may be configured to perform steps and/or procedures corresponding to the compute-aware router or the leaf router in the foregoing method embodiments.

This application further provides a readable storage medium. The readable storage medium stores executable instructions. When at least one processor of the apparatus executes the executable instructions, the apparatus shown in FIG. 18 performs the compute-aware routing method in the foregoing method embodiments.

A person of ordinary skill in the art may understand that all or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

What is claimed is:

1. A compute-aware routing method, comprising:
receiving, by a compute-aware router, compute-aware routing information of at least one computing container, wherein the compute-aware routing information comprises a computing code or a computing metric;
determining, by the compute-aware router, a routing information base (RIB) based on the compute-aware routing information; wherein either the RIB comprises a function identifier (FID) of a function that can be provided by the computing container or the RIB comprises an Internet Protocol (IP) address prefix of the computing container in which the function is located and either one of the computing code or the computing metric; and wherein the function comprises at least one of a software-defined computing program, a function program, a service software, or a microservice that is deployed in the computing container; and
receiving, by the compute-aware router, a packet, and forwarding the packet based on a forwarding information base (FIB), wherein the FIB is determined based on the RIB, and the FIB comprises the FID or the IP address prefix.

2. The method according to claim 1, wherein the method further comprises:
sending, by the compute-aware router, the compute-aware routing information to another compute-aware router in a network.

3. The method according to claim 1, wherein when the compute-aware router does not find, in the FIB, a FIB entry corresponding to the packet, the method further comprises:
determining, by the compute-aware router based on the computing code or the computing metric in the RIB, the FIB entry corresponding to the packet.

4. The method according to claim 1, wherein the RIB comprises:
the FID, the computing metric, the IP address prefix, and an egress port;
the FID, the computing code, the IP address prefix, and an egress port;
the FID, the computing metric, an IP address of the compute-aware router, and an egress port;
the FID, the computing code, an IP address of the compute-aware router, and an egress port;
the IP address prefix, the computing metric, and an egress port;
the IP address prefix, the computing code, and an egress port;
the FID, the computing metric, and an egress port; or
the FID, the computing code, and an egress port; and
wherein the FIB comprises:
the FID, the IP address prefix, and the egress port;
the FID, the IP address of the compute-aware router, and the egress port; or
the FID and the egress port.

5. The method according to claim 4, wherein when the packet carries the FID, the forwarding the packet based on the FIB comprises:
searching, by the compute-aware router, the FIB for the IP address prefix and the egress port that correspond to the FID, and
adding, by the compute-aware router, the IP address prefix corresponding to the FID to obtain a destination IP address, and forwarding the packet based on the destination IP address; or
searching, by the compute-aware router, the FIB for the IP address of the compute-aware router and the egress port that correspond to the FID,
performing, by the compute-aware router, tunnel encapsulation on the packet, wherein the IP address of the compute-aware router is used as a tunnel destination address, or adding segment routing (SR) encapsulation to the packet by using the IP address of the compute-aware router as a segment identifier of SR, and
forwarding, by the compute-aware router, the packet on which the tunnel encapsulation or the SR encapsulation is performed; or
searching, by the compute-aware router, the FIB for the egress port corresponding to the FID or the IP address prefix, and
forwarding, by the compute-aware router, the packet through the egress port.

6. The method according to claim 1, wherein the computing code comprises:
at least one of an evaluated computing delay value or a computing capacity level,
a machine type or a weighted value $\alpha 2$ related to machine type, and
a server load; and
when the compute-aware routing information comprises the computing code, the method further comprises:

calculating, by the compute-aware router, the computing metric based on the computing code and the following formula:

$$\text{computing metric} = \frac{\alpha 2 \times \text{computing capacity level}}{1 - \beta 2 \times \text{server load}} + \gamma 2 \times \text{evaluated computing delay value};$$

$$\text{computing metric} = \frac{\alpha 2 \times \text{computing capacity level}}{1 - \beta 2 \times \text{server load}};$$

or computing metric = $\gamma 2 \times$ evaluated computing delay value, wherein
β2 and γ2 are weighted values.

7. The method according to claim 3, wherein the method further comprises:
when the compute-aware router receives a response packet, determining the FIB entry as a valid FIB entry; or
when the compute-aware router does not receive the response packet, deleting the FIB entry.

8. A compute-aware routing apparatus, comprising:
one or more processors; and
a computer-readable memory storing a program to be executed by the one or
more processors, the program including instructions that, when executed by the one or more processors, cause the apparatus to:
receive compute-aware routing information of at least one computing container, wherein the compute-aware routing information comprises a computing code or a computing metric;
determine a routing information base (RIB) based on the compute-aware routing information, wherein the RIB comprises either a function identifier (FID) of a function that can be provided by the computing container or the RIB comprises an Internet Protocol (IP) address prefix of the computing container in which the function is located and either one of the computing code or the computing metric, and wherein the function comprises at least one of a software-defined computing program, a function program, a service software, or a microservice that is deployed in the computing container;
receive a packet; and
forward the packet based on a forwarding information base (FIB), wherein the FIB is determined based on the RIB, and the FIB comprises the FID or the IP address prefix.

9. The apparatus according to claim 8, wherein the program further comprises instructions that cause the apparatus to: send the compute-aware routing information to another compute-aware router in a network.

10. The apparatus according to claim 8, wherein the program further comprises instructions that cause the apparatus to:
determine, based on the computing code or the computing metric in the RIB, the FIB entry corresponding to the packet.

11. The apparatus according to claim 8, wherein the RIB comprises:
the FID, the computing metric, the IP address prefix, and an egress port;
the FID, the computing code, the IP address prefix, and an egress port;
the FID, the computing metric, an IP address of the compute-aware router, and an egress port;
the FID, the computing code, an IP address of the compute-aware router, and an egress port;
the IP address prefix, the computing metric, and an egress port;
the IP address prefix, the computing code, and an egress port;
the FID, the computing metric, and an egress port; or
the FID, the computing code, and an egress port; and
wherein the FIB comprises:
the FID, the IP address prefix, and the egress port;
the FID, the IP address of the compute-aware router, and the egress port; or
the FID and the egress port.

12. The apparatus according to claim 11, wherein when the packet carries the FID, the program further comprises instructions that cause the apparatus to:
search the FIB for the IP address prefix and the egress port that correspond to the FID, and
add the IP address prefix corresponding to the FID to obtain a destination IP address, and forward the packet based on the destination IP address; or
search the FIB for the IP address of the compute-aware router and the egress port that correspond to the FID,
add tunnel encapsulation to the packet by using the IP address of the compute-aware router as a tunnel destination address, or add segment routing (SR) encapsulation to the packet by using the IP address of the compute-aware router as a segment identifier of segment routing (SR), and
forward the packet to which the tunnel encapsulation or SR encapsulation is added; or
search the FIB for the egress port corresponding to the FID or the IP address prefix, and
forward the packet through the egress port.

13. The apparatus according to claim 8, wherein the computing code comprises:
at least one of an evaluated computing delay value or a computing capacity level,
a machine type or a weighted value α2 related to the machine type, and
a server load; and
when the compute-aware routing information comprises the computing code, the program further comprises instructions that cause the apparatus to:
calculate the computing metric based on the computing code and the following formula:

$$\text{computing metric} = \frac{\alpha 2 \times \text{computing capacity level}}{1 - \beta 2 \times \text{server load}} + \gamma 2 \times \text{evaluated computing delay value};$$

$$\text{computing metric} = \frac{\alpha 2 \times \text{computing capacity level}}{1 - \beta 2 \times \text{server load}}; \text{ or}$$

computing metric = $\gamma 2 \times$ evaluated computing delay value, wherein
β2 and γ2 are weighted values.

* * * * *